(12) United States Patent
Ishimaru

(10) Patent No.: US 7,282,007 B2
(45) Date of Patent: Oct. 16, 2007

(54) MULTIPLE-SPEED TRANSMISSION FOR AUTOMOTIVE VEHICLE

(75) Inventor: Wataru Ishimaru, Kanagawa (JP)

(73) Assignee: Jatco Ltd., Shizuoka (JP)

( * ) Notice: Subject to any disclaimer, the term of this patent is extended or adjusted under 35 U.S.C. 154(b) by 203 days.

(21) Appl. No.: 10/889,049

(22) Filed: Jul. 13, 2004

(65) Prior Publication Data

US 2005/0026739 A1 Feb. 3, 2005

(30) Foreign Application Priority Data

Jul. 28, 2003 (JP) ............................ 2003-202222

(51) Int. Cl.
*F16H 3/62* (2006.01)
(52) U.S. Cl. ...................... 475/275; 475/276; 475/313; 475/319; 475/325
(58) Field of Classification Search ................ 475/275, 475/276, 280, 313, 319, 325
See application file for complete search history.

(56) References Cited

U.S. PATENT DOCUMENTS

| 5,133,697 A * | 7/1992 | Hattori ....................... 475/276 |
| 5,135,444 A | 8/1992 | Hattori |
| 6,139,463 A * | 10/2000 | Kasuya et al. .............. 475/275 |
| 7,052,433 B2 * | 5/2006 | Sugiura et al. ............. 475/296 |
| 2003/0216211 A1 * | 11/2003 | Miyazaki et al. ........... 475/276 |
| 2004/0248694 A1 | 12/2004 | Ishimaru |
| 2005/0250615 A1 * | 11/2005 | Usoro et al. ................ 475/275 |
| 2006/0270513 A1 * | 11/2006 | Klemen ...................... 475/275 |

FOREIGN PATENT DOCUMENTS

| JP | 2-229944 A | 9/1990 |
| JP | 2000-110900 A | 4/2000 |
| JP | 2001-182785 A | 7/2001 |
| JP | 2002-122191 A | 4/2002 |

* cited by examiner

*Primary Examiner*—Sherry Estremsky
(74) *Attorney, Agent, or Firm*—Foley & Lardner LLP

(57) ABSTRACT

A multiple-speed transmission provides a wide gear ratio coverage for an automotive vehicle by using a basic structure of a six-speed transmission. The multiple-speed transmission is comprised of a combination of two planetary gearsets, three clutches, and three brakes. Each speed is established by applying two of six elements of the three clutches and the three brakes.

10 Claims, 14 Drawing Sheets

FIRST EMBODIMENT

FIRST EMBODIMENT

FIG.2

|  | C1 | C2 | C3 | B1 | B2 | B3 | GEAR RATIO | 6-SPEED AT |
|---|---|---|---|---|---|---|---|---|
| 1ST | ● |  |  | ● |  |  | 4.51 | 1ST |
| 2ND | ● |  |  |  |  | ● | 2.88 | – |
| 3RD | ● |  |  |  | ● |  | 2.42 | 2ND |
| 4TH | ● | ● |  |  |  |  | 1.58 | 3RD |
| 5TH | ● |  | ● |  |  |  | 1.15 | 4TH |
| 6TH |  | ● | ● |  |  |  | 0.87 | 5TH |
| 7TH |  |  | ● |  | ● |  | 0.71 | 6TH |
| 8TH |  |  | ● |  |  | ● | 0.56 | – |
| REV1 |  | ● |  | ● |  |  | -5.53 | REV |
| REV2 |  | ● |  |  |  | ● | -0.49 | – |

RATIO COVERAGE OF 8-SPEED
    AUTOMATIC TRANSMISSION: 1ST/8TH 8.13
RATIO COVERAGE OF 6-SPEED
    AUTOMATIC TRANSMISSION: 1ST/6TH 6.35

GEAR RATIO OF PLANETARY GEARSET
$\begin{cases} \alpha 1 & 0.58 & S1/R1 \\ \alpha 2 & 0.4 & S2/R2 \\ \alpha 3 & 0.35 & S3/R2 \\ \alpha 4 & 0.60 & S4/R2 \end{cases}$ NUMBER OF TEETH:
S2 40    Pb2b 40
R2 100
S4 60    Pb2a 30

POWER FLOW IN 1ST

POWER FLOW IN 2ND

POWER FLOW IN 3RD

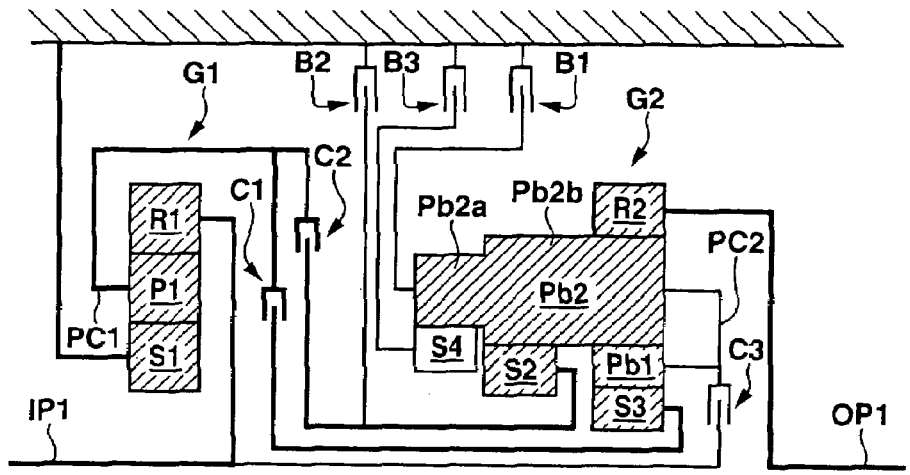
FIG.5A POWER FLOW IN 4TH
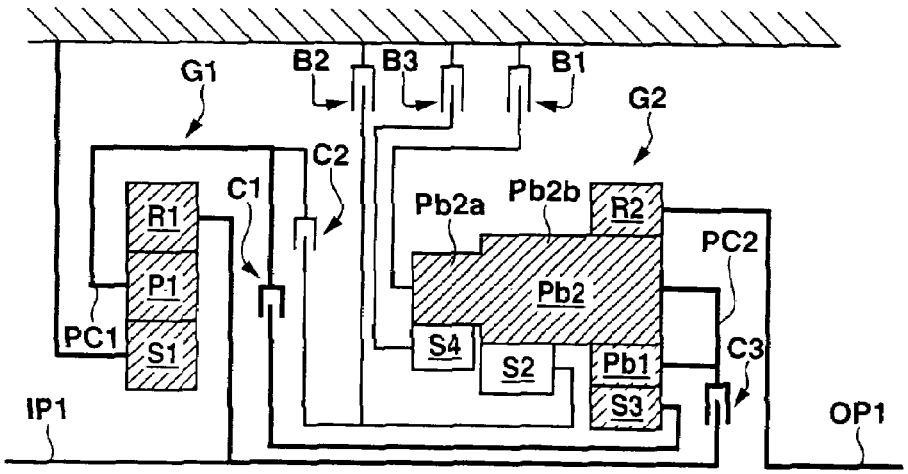
FIG.5B POWER FLOW IN 5TH
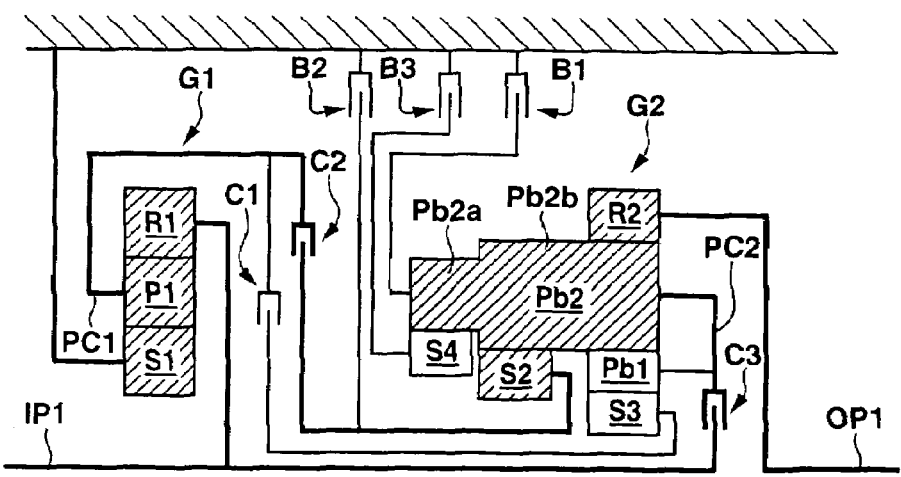
FIG.5C POWER FLOW IN 6TH

POWER FLOW IN 7TH

POWER FLOW IN 8TH

POWER FLOW IN 1ST REVERSE

POWER FLOW IN 2ND REVERSE

SECOND EMBODIMENT

POWER FLOW IN 1ST

POWER FLOW IN 2ND

POWER FLOW IN 3RD

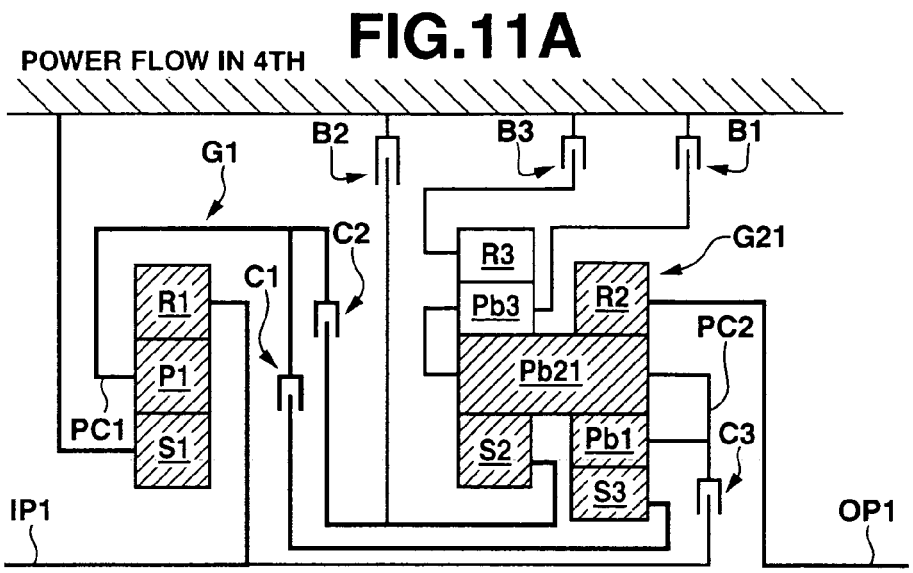
FIG.11A POWER FLOW IN 4TH
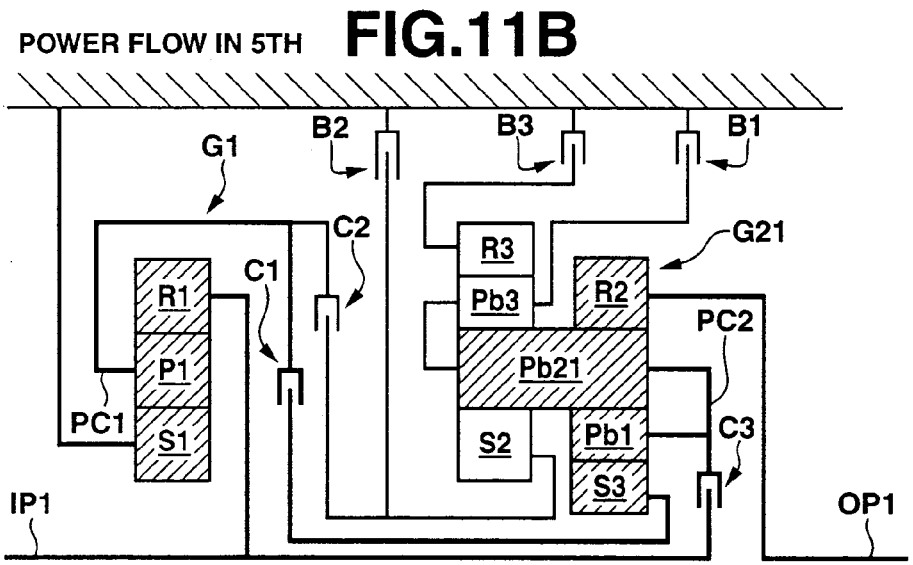
FIG.11B POWER FLOW IN 5TH
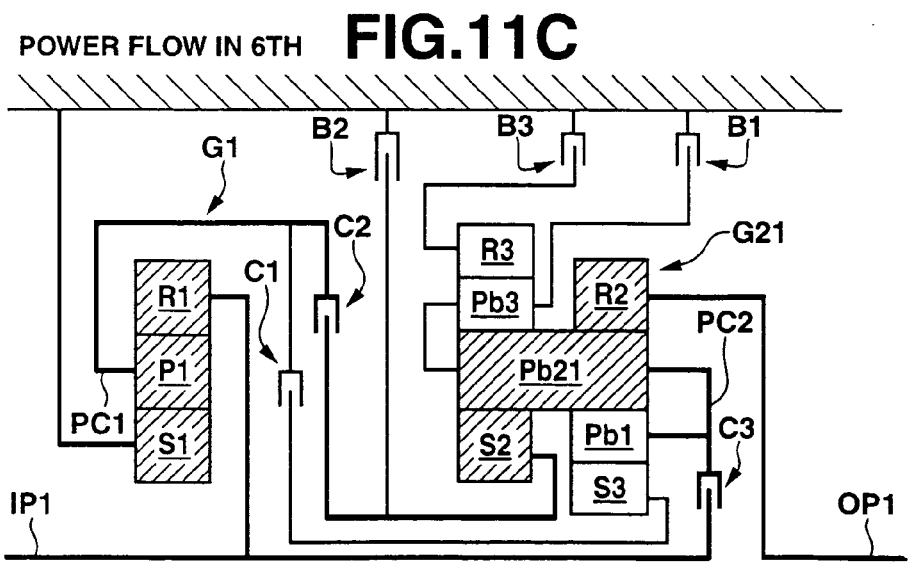
FIG.11C POWER FLOW IN 6TH

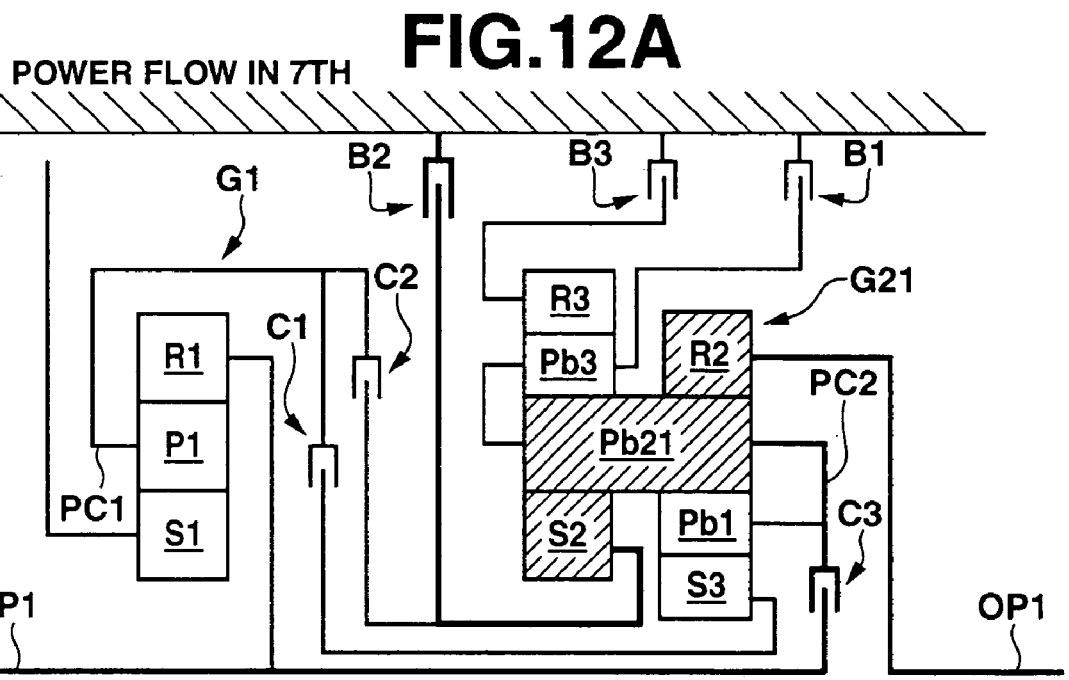
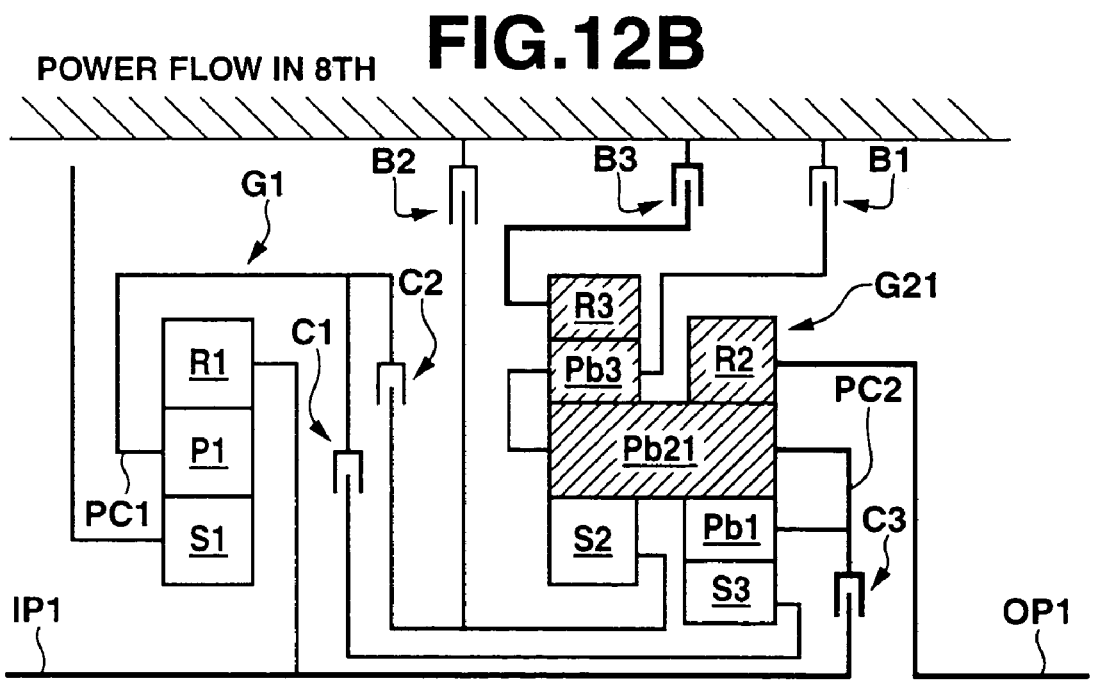

POWER FLOW IN 1ST REVERSE

POWER FLOW IN 2ND REVERSE

MULTIPLE-SPEED TRANSMISSION FOR AUTOMOTIVE VEHICLE

BACKGROUND OF THE INVENTION

The present invention relates generally to multiple-speed transmissions for automotive vehicles, and more particularly to a gearbox of a multiple-speed automatic transmission for an automotive vehicle.

Recent years, there have been disclosed various multiple-speed transmissions with more than six forward speeds. One such transmission is disclosed in Japanese Patent Provisional Publication No. 2001-182785 published Jul. 6, 2001. In the publication, a six-speed transmission is comprised of a speed-reducing planetary gearset with one of the rotating members stationary, a Ravigneaux planetary gearset, three clutches, and two brakes. In addition, an eight-speed transmission is comprised by adding a forth clutch to the six-speed transmission.

SUMMARY OF THE INVENTION

In the aforementioned publication, the eight-speed transmission additionally provides a gear ratio between the third speed and the fourth speed, and another gear ratio between the fourth speed and the fifth speed of the six-speed transmission. Accordingly, the gear ratio coverage, that is, the gear ratio of the lowest speed divided by the gear ratio of the highest speed, of the transmission is not varied with the multiplication of gear ratios. However, increasing the gear ratio coverage is desired for improvement of fuel efficiency. With the aforementioned structure, it is difficult to provide wide gear ratio coverage by multiplication of gear ratios with common planetary gearsets.

Accordingly, it is an object of the present invention to provide a multiple-speed transmission for an automotive vehicle that includes a common basic structure and provides a wider gear ratio coverage by multiplication of gear ratios.

In order to accomplish the aforementioned and other objects of the present invention, a multiple-speed transmission for an automotive vehicle comprises an input section, an output section, a speed-reducing planetary gearset including a first rotating element having a first primary speed slower than the input section, a second rotating element drivingly connected to the input section and having a second primary speed faster than the first primary speed in the same direction as the first rotating element, and a third rotating element held against rotation, a speed-shifting planetary gearset including five rotating members including a first rotating member, a second rotating member, a third rotating member, a fourth rotating member, and a fifth rotating member, the second rotating member of the speed-shifting planetary gearset drivingly connected to the output section, a first clutch for selectively drivingly connecting and disconnecting the first rotating element of the speed-reducing planetary gearset and the first rotating member of the speed-shifting planetary gearset, a second clutch for selectively drivingly connecting and disconnecting the first rotating element of the speed-reducing planetary gearset and the fourth rotating member of the speed-shifting planetary gearset, a third clutch for selectively drivingly connecting and disconnecting the second rotating element of the speed-reducing planetary gearset and the third rotating member of the speed-shifting planetary gearset, a first brake operable to hold selectively against rotation the third rotating member of the speed-shifting planetary gearset, a second brake operable to hold selectively against rotation the fourth rotating member of the speed-shifting planetary gearset, and a third brake operable to hold selectively against rotation the fifth rotating member of the speed-shifting planetary gearset.

According to another aspect of the invention, a multiple-speed transmission for an automotive vehicle comprises an input section, an output section, a speed-reducing planetary gearset including a first rotating element having a first primary speed slower than the input section, a second rotating element drivingly connected to the input section and having a second primary speed faster than the first primary speed in the same direction as the first rotating element, and a third rotating element held against rotation, a second planetary gearset including a second sun gear, a third sun gear, a fourth sun gear, a second ring gear drivingly connected to the output section, a second planet-pinion carrier, a second planet pinion rotatably supported on the second planet-pinion carrier and meshed with the third sun gear, a third planet pinion rotatably supported on the second planet-pinion carrier, the third planet pinion comprising a smaller-diameter section meshed with the fourth sun gear, and a larger-diameter section meshed with the second sun gear, the second ring gear, and the second planet pinion, a first clutch for selectively drivingly connecting and disconnecting the first rotating element of the first planetary gearset and the third sun gear, a second clutch for selectively drivingly connecting and disconnecting the first rotating element of the first planetary gearset and the second sun gear, a third clutch for selectively drivingly connecting and disconnecting the second rotating element of the first planetary gearset and the second planet-pinion carrier, a first brake operable to hold selectively against rotation the second planet-pinion carrier, a second brake operable to hold selectively against rotation the second sun gear, and a third brake operable to hold selectively against rotation the fourth sun gear.

According to a further aspect of the invention, a multiple-speed transmission for an automotive vehicle comprises an input section, an output section, a speed-reducing planetary gearset including a first rotating element having a first primary speed slower than the input section, a second rotating element drivingly connected to the input section and having a second primary speed faster than the first primary speed in the same direction as the first rotating element, and a third rotating element held against rotation, a second planetary gearset including a second sun gear, a third sun gear, a second ring gear drivingly connected to the output gear, a third ring gear, a second planet-pinion carrier, a second planet pinion rotatably supported on the second planet-pinion carrier and meshed with the third sun gear, a fourth planet pinion rotatably supported on the second planet-pinion carrier and meshed with the third ring gear, a third planet pinion rotatably supported on the second planet-pinion carrier and meshed with the second sun gear, the second ring gear, the second planet pinion, and the fourth planet pinion, a first clutch for selectively drivingly connecting and disconnecting the first rotating element of the first planetary gearset and the third sun gear, a second clutch for selectively drivingly connecting and disconnecting the first rotating element of the first planetary gearset and the second sun gear, a third clutch for selectively drivingly connecting and disconnecting the second rotating element of the first planetary gearset and the second planet-pinion carrier, a first brake operable to hold selectively against rotation the second planet-pinion carrier, a second brake operable to hold selectively against rotation the second sun gear, and a third brake operable to hold selectively against rotation the third ring gear.

According to a still further aspect of the invention, a multiple-speed transmission for an automotive vehicle comprises input means for receiving an input power, output means for outputting a transmitted power, speed-reducing means including a first rotating element having a first primary speed fatie slower than the input means, a second rotating element drivingly connected to the input means and having a second primary speed faster than the first primary speed in the same direction as the first rotating element, and a third rotating element held against rotation, speed-shifting means including five rotating members including a first rotating member, a second rotating member, a third rotating member, a fourth rotating member, and a fifth rotating member, the second rotating member of the speed-shifting planetary gearset drivingly connected to the output means, first torque transmitting means for selectively drivingly connecting and disconnecting the first rotating element of the speed-reducing means and the first rotating member of the speed-shifting means, second torque transmitting means for selectively drivingly connecting and disconnecting the first rotating element of the speed-reducing means and the fourth rotating member of the speed-shifting means, third torque transmitting means for selectively drivingly connecting and disconnecting the second rotating element of the speed-reducing means and the third rotating member of the speed-shifting means, fourth torque transmitting means for holding selectively against rotation the third rotating member of the speed-shifting means, fifth torque transmitting means for holding selectively against rotation the fourth rotating member of the speed-shifting means, and sixth torque transmitting means for holding selectively against rotation the fifth rotating member of the speed-shifting means.

The above objects and other objects, features, and advantages of the present invention are readily apparent from the following detailed description of the best modes for carrying out the invention when taken in connection with the accompanying drawings.

BRIEF DESCRIPTION OF THE SEVERAL VIEWS OF THE DRAWINGS

FIG. 2 is a diagram depicting clutch engagements and brake applications required to establish various gear speeds of the multiple-speed automatic transmission of the first embodiment.

FIG. 5A is a schematic diagram depicting a power flow in the fourth speed of the multiple-speed automatic transmission of the first embodiment.

FIG. 5B is a schematic diagram depicting a power flow in the fifth speed of the multiple-speed automatic transmission of the first embodiment.

FIG. 5C is a schematic diagram depicting a power flow in the sixth speed of the multiple-speed automatic transmission of the first embodiment.

FIG. 11A is a schematic diagram depicting a power flow in the fourth speed of the multiple-speed automatic transmission of the second embodiment.

FIG. 11B is a schematic diagram depicting a power flow in the fifth speed of the multiple-speed automatic transmission of the second embodiment.

FIG. 11C is a schematic diagram depicting a power flow in the sixth speed of the. multiple-speed automatic transmission of the second embodiment.

FIG. 12A is a schematic diagram depicting a power flow in the seventh speed of the multiple-speed automatic transmission of the second embodiment.

FIG. 12B is a schematic diagram depicting a power flow in the eighth speed of the multiple-speed automatic transmission of the second embodiment.

DETAILED DESCRIPTION OF THE INVENTION

Figure 1:
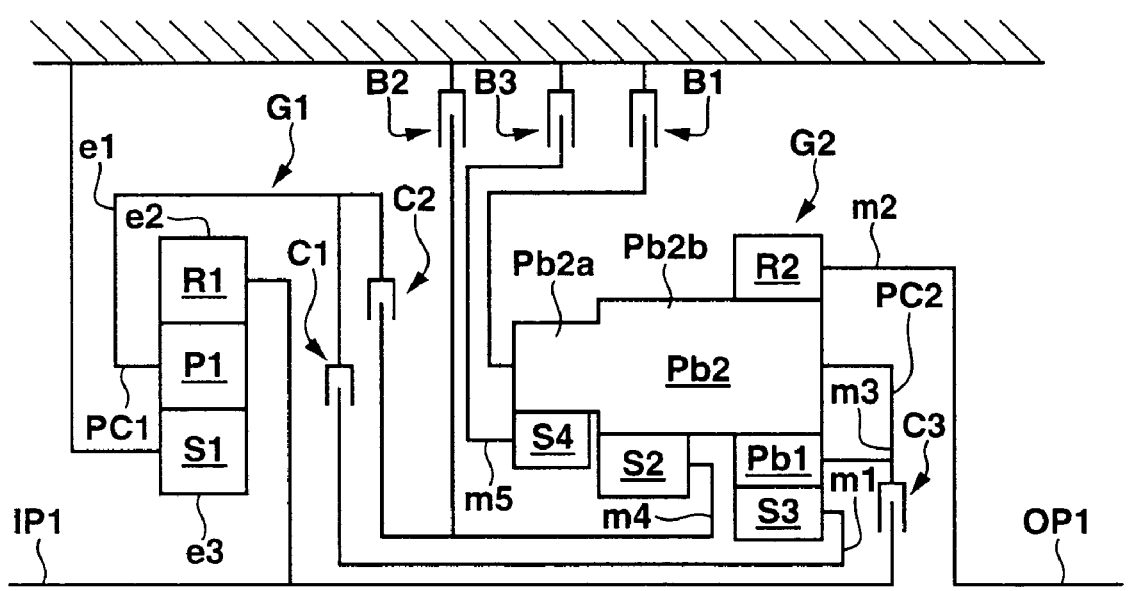
FIG. 1 is a schematic diagram depicting a multiple-speed automatic transmission for an automotive vehicle of a first embodiment.

Referring now to FIG. 1, there is shown a multiple-speed automatic transmission for an automotive vehicle of a first embodiment of the present invention. The multiple-speed automatic transmission provides eight forward speeds and two reverse speeds. The multiple-speed automatic transmission includes a first planetary gearset G1 at the left, and a speed-shifting planetary gearset G2 at the right arranged along the axis. First planetary gearset G1 is of the single-pinion type, to serve for a speed-reducing planetary gearset as a speed-reducing unit. Speed-shifting planetary gearset G2 is a compound planetary gearset.

First planetary gearset G1, which is of the single-pinion type, consists of a first sun gear S1, a first ring gear R1, and a first planet-pinion carrier PC1 that carries or rotatably supports a first planet pinion P1 meshed with both first sun gear S1 and first ring gear R1. First sun gear S1 as a third rotating element e3 is continuously held against rotation to a transmission housing. First planet-pinion carrier PC1 serves for a first rotating element e1 of first planetary gearset G1 with a first primary speed slower than that of first ring gear R1 that serves for a second rotating element e2 of first planetary gearset G1.

Speed-shifting planetary gearset G2 consists of three sun gears of a second sun gear S2, a third sun gear S3 and a fourth sun gear S4, a second ring gear R2, and a second planet-pinion carrier PC2 that carries or rotatably supports two planet pinions of a second planet pinion Pb1 and a third planet pinion Pb2. Third planet pinion Pb2 is formed of a two-stepped cylindrical shape, that is, includes integrally two sections of a smaller-diameter section Pb2a and a larger-diameter section Pb2b that have two different numbers of teeth. Smaller-diameter section Pb2a of third planet pinion Pb2 is meshed with fourth sun gear S4. Larger-diameter section Pb2b of third planet pinion Pb2 is meshed with second ring gear R2, second sun gear S2 and second planet pinion Pb1. Second planet pinion Pb1 is meshed with third sun gear S3.

Speed-shifting planetary gearset G2 includes five rotating members. A first rotating member m1 consists of elements that rotate solidly with third sun gear S3. A second rotating member m2 consists of elements that rotate solidly with second ring gear R2. A third rotating member m3 consists of elements that rotate solidly with second planet-pinion carrier PC2. A fourth rotating member m4 consists of elements that rotate solidly with second sun gear S2. A fifth rotating member m5 consists of elements that rotate solidly with fourth sun gear S4.

The aforementioned structure is connected to an input section, such as an input shaft IP1 and an output section, such as an output shaft OP1. Input shaft IP1 is drivingly connected to first ring gear R1, to input driving torque transmitted via a torque converter (not shown) and others from an engine (not shown) as a drive source. Output shaft OP1 is drivingly connected to second ring gear R2, to output driving torque via a final gear (not shown) and others to a driving wheel (not shown).

Additionally, the multiple-speed automatic transmission includes three clutches and three brakes. A first clutch C1 selectively connects or disconnects first planet-pinion carrier PC1 and third sun gear S3 (first rotating member m1). A second clutch C2 selectively connects or disconnects first planet-pinion carrier PC1 and second sun gear S2 (fourth rotating member m4). A third clutch C3 selectively connects or disconnects input shaft IP1 and second planet-pinion carrier PC2 (third rotating member m3). A first brake B1 is operable to selectively hold against rotation to the transmission housing or release second planet-pinion carrier PC2 (third rotating member m3). A second brake B2 is operable to selectively hold against rotation to the transmission housing or release second sun gear S2 (fourth rotating member m4). A third brake B3 is operable to selectively hold against rotation to the transmission housing or release fourth sun gear S4 (fifth rotating member m5).

Clutches C1, C2, and C3 and brakes B1, B2, and B3 are connected to a transmission control unit (not shown) as a transmission controlling means for supplying engaging pressure and releasing pressure according to clutch engagements and brake applications required to establish various gear speeds. The transmission control unit may be of the hydraulic control type, the electronic control type, or the electro-hydraulic control type.

Figure 3:
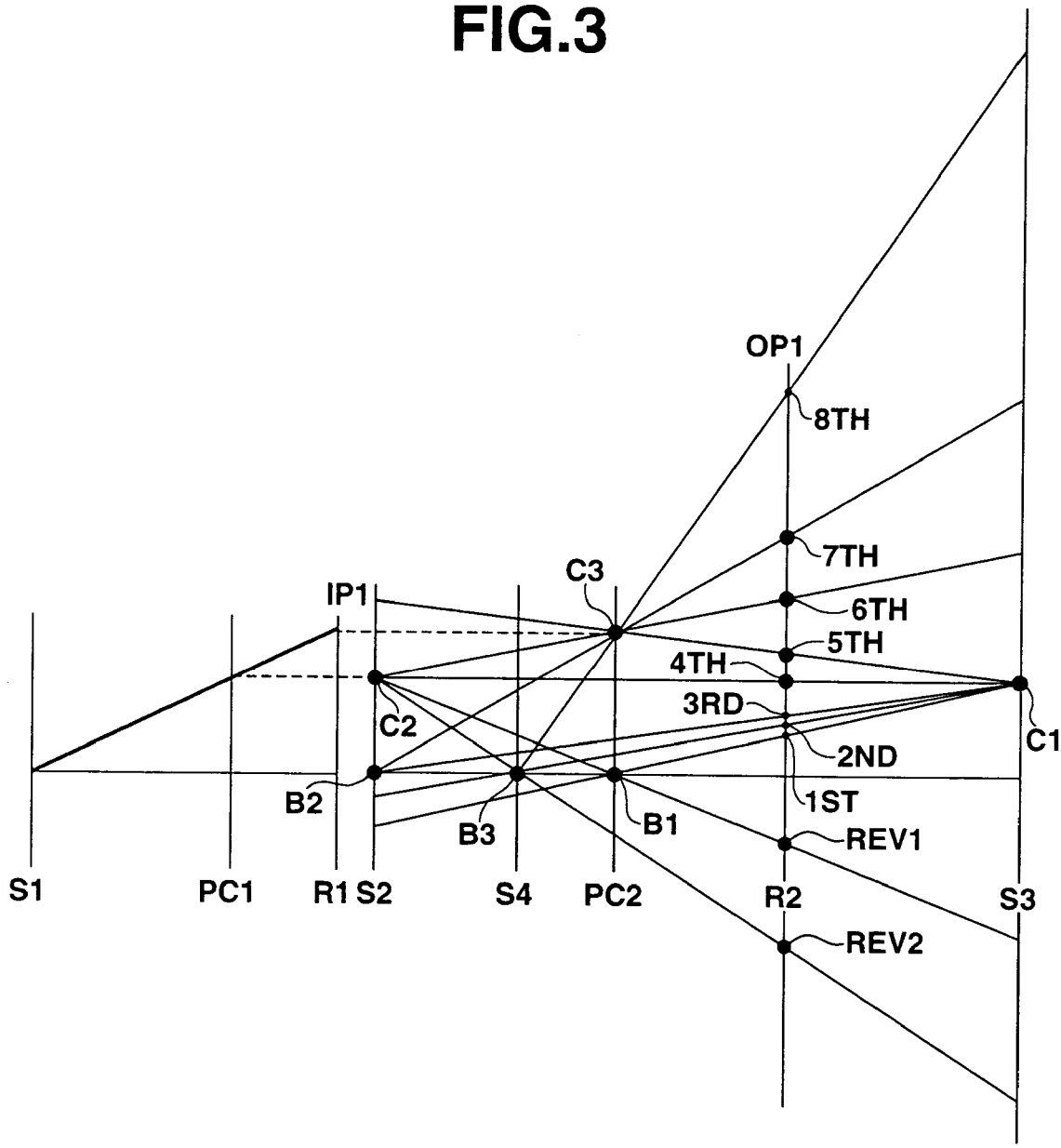
FIG. 3 is a collinear diagram of the multiple-speed automatic transmission of the first embodiment.

Referring now to FIGS. 2 through 7B, the following describes the operation of the multiple-speed automatic transmission of the first embodiment. FIG. 2 shows clutch engagements and brake applications required to establish various gear speeds. In FIG. 2, a solid circle in a cell indicates that the corresponding clutch or brake is applied in the corresponding speed, and a blank indicates that the corresponding clutch or brake is released in the corresponding speed. FIG. 3 shows the collinear diagram of the multiple-speed automatic transmission. The collinear diagram shows the rotation states of the rotating members in each speed. In FIG. 3, a bold line indicates the collinear diagram of first planetary gearset G1, and medium bold lines indicate the collinear diagram of speed-shifting planetary gearset G2. Speed-shifting planetary gearset G2 takes a rotation state determined by a combination of rotations of two of the five rotating members, where each of the five rotating members of speed-shifting planetary gearset G2 has a rotation speed that monotonously varies in order of first rotating member m1, second rotating member m2, third rotating member m3, fifth rotating member m5, and fourth rotating member m4. FIGS. 4A to 7B show the power flow or the torque flow in each speed. In FIGS. 4A to 7B, the power flow through the clutches, the brakes, and the rotating members is indicated by bold lines, the power flow through the gears is indicated by a hatch pattern.

The first speed is established by engaging first clutch C1 and applying first brake B1, as shown in FIG. 2. First, the rotation speed of input shaft IP1 is reduced at first planetary gearset G1. At speed-shifting planetary gearset G2, with first clutch C1 engaged, the reduced speed is input to third sun gear S3 from first planet-pinion carrier PC1 of first planetary gearset G1. On the other hand, with first brake B1 applied, second planet-pinion carrier PC2 is fixed to the transmission housing. In this state, third sun gear S3, second planet-pinion carrier PC2 that carries second planet pinion Pb1 and larger-diameter section Pb2b of third planet pinion Pb2, and second ring gear R2 are assumed to form a planetary gearset of the double-pinion type with a planet-pinion carrier fixed. Therefore, with third sun gear S3 rotating at a speed reduced at first planetary gearset G1, second ring gear R2 is forced to rotate at a further reduced speed, thereby outputs the rotation speed to output shaft OP1.

The collinear diagram of the multiple-speed automatic transmission as shown in FIG. 3 provides another analysis of the first speed. The point identified by C1 in the diagram, or the engagement point of first clutch C1 indicates the engagement of first clutch C1 with which the reduced speed is input to third sun gear S3 from first planetary gearset G1. The point identified by B1 in the diagram, or the application point of first brake B1 indicates the application of first brake B1 with which second planet-pinion carrier PC2 is held stationary. The operation of speed-shifting planetary gearset G2 is defined by the lever or straight line connecting the engagement point of first clutch C1 and the application point of first brake B1. The intersection point of the lever and the perpendicular line at output shaft OP1 indicates the output speed. In the first speed, the rotation speed of input shaft IP1 is reduced to a point identified by 1ST in the diagram through the multiple-speed automatic transmission, and output to output shaft OP1.

Figure 4A:
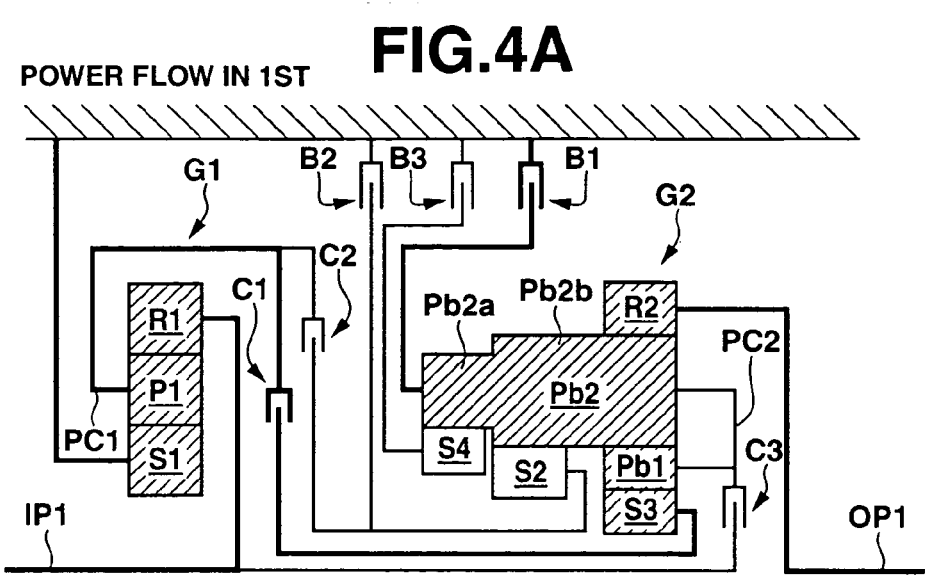
FIG. 4A is a schematic diagram depicting a power flow in the first speed of the multiple-speed automatic transmission of the first embodiment.

The power flow or torque flow in the first speed is shown in FIG. 4A. The power flows through first clutch C1, first brake B1, and the rotating members, as shown by bold lines, and first planetary gearset G1, and speed-shifting planetary gearset G2 except second sun gear S2 and fourth sun gear S4, as shown by a hatch pattern. In this speed, first planetary gearset G1 and speed-shifting planetary gearset G2 serve for the transmission of power and torque.

The second speed is established by releasing first brake B1 and applying third brake B3 to the operational state of the first speed, that is, by engaging first clutch C1 and applying third brake B3, as shown in FIG. 2. First, the rotation speed of input shaft IP1 is reduced at first planetary gearset G1. At speed-shifting planetary gearset G2, with first clutch C1 engaged, the reduced speed is input to third sun gear S3 from first planet-pinion carrier PC1 of first planetary gearset G1. On the other hand, with third brake B3 applied, fourth sun gear S4 is fixed to the transmission housing. Fourth sun gear S4, second planet-pinion carrier PC2 that carries third planet pinion Pb2, and second ring gear R2 are assumed to form a planetary gearset. With fourth sun gear S4 fixed and second ring gear R2 rotating, second planet-pinion carrier PC2 is forced to rotate at a speed reduced from the speed of second ring gear R2. At the same time, third sun gear S3, second planet-pinion carrier PC2 that carries second planet pinion Pb1 and third planet pinion Pb2, and second ring gear R2 are assumed to form a planetary gearset of the double-pinion type with a planet-pinion carrier rotating at a low speed. Therefore, with third sun gear S3 rotating at a speed reduced at first planetary gearset G1, second ring gear R2 is forced to rotate at a further reduced speed (faster than the first speed), thereby outputs the rotation speed to output shaft OP1.

The collinear diagram of the multiple-speed automatic transmission as shown in FIG. 3 provides another analysis of the second speed. The point identified by C1 in the diagram, or the engagement point of first clutch C1 indicates the engagement of first clutch C1 with which the reduced speed is input to third sun gear S3 from first planetary gearset G1. The point identified by B3 in the diagram, or the application point of third brake B3 indicates the application of third brake B3 with which fourth sun gear S4 is held stationary. The operation of speed-shifting planetary gearset G2 is defined by the lever or straight line connecting the engagement point of first clutch C1 and the application point of third brake B3. The intersection point of the lever and the perpendicular line at output shaft OP1 indicates the output speed. In the second speed, the rotation speed of input shaft IP1 is reduced to a point identified by 2ND in the diagram through the multiple-speed automatic transmission, and output to output shaft OP1.

Figure 4B:
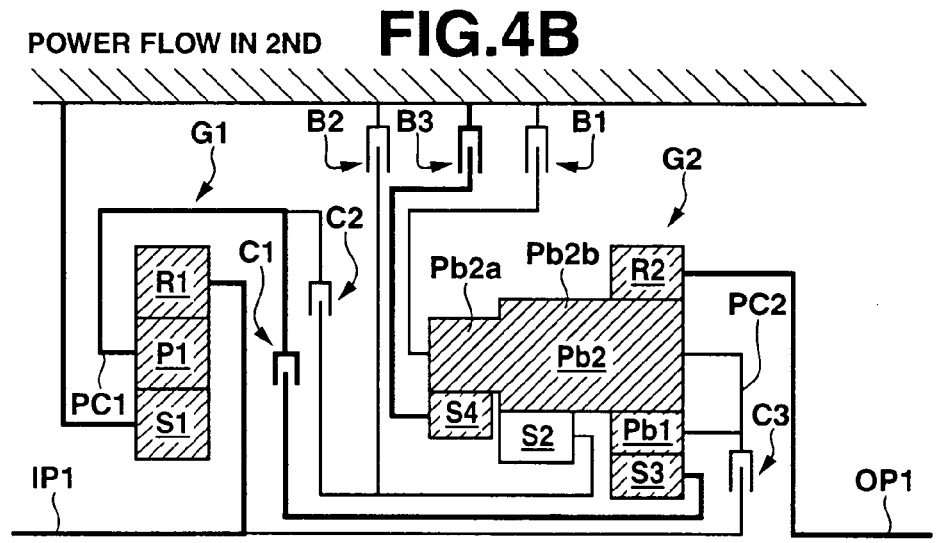
FIG. 4B is a schematic diagram depicting a power flow in the second speed of the multiple-speed automatic transmission of the first embodiment.

The power flow or torque flow in the second speed is shown in FIG. 4B. The power flows through first clutch C1, third brake B3, and the rotating members, as shown by bold lines, first planetary gearset G1 and speed-shifting planetary gearset G2 except second sun gear S2, as shown by a hatch pattern. In this speed, first planetary gearset G1 and speed-shifting planetary gearset G2 serve for the transmission of power and torque.

The third speed is established by releasing third brake B3 and applying second brake B2 to the operational state of the second speed, that is, by engaging first clutch C1 and applying second brake B2, as shown in FIG. 2. First, the rotation speed of input shaft IP1 is reduced at first planetary gearset G1. At speed-shifting planetary gearset G2, with first clutch C1 engaged, the reduced speed is input to third sun gear S3 from first planet-pinion carrier PC1 of first planetary gearset G1. On the other hand, with second brake B2 applied, second sun gear S2 is fixed to the transmission housing. Second sun gear S2, second planet-pinion carrier PC2 that carries larger-diameter section Pb2b of third planet pinion Pb2, and second ring gear R2 are assumed to form a planetary gearset. With second sun gear S2 fixed and second ring gear R2 rotating, second planet-pinion carrier PC2 is forced to rotate at a speed reduced from the speed of second ring gear R2. At the same time, third sun gear S3, second planet-pinion carrier PC2 that carries second planet pinion Pb1 and third planet pinion Pb2, and second ring gear R2 are assumed to form a planetary gearset of the double-pinion type with a planet-pinion carrier rotating at a low speed. Therefore, with third sun gear S3 rotating at a speed reduced at first planetary gearset G1, second ring gear R2 is forced to rotate at a further reduced speed that is faster than the second speed according to the difference between gear ratios of second sun gear S2 to larger-diameter section Pb2b of third planet pinion Pb2 and fourth sun gear S4 to smaller-diameter section Pb2a of third planet pinion Pb2, thereby outputs the rotation speed to output shaft OP1.

The collinear diagram of the multiple-speed automatic transmission as shown in FIG. 3 provides another analysis of the third speed. The point identified by C1 in the diagram, or the engagement point of first clutch C1 indicates the engagement of first clutch C1 with which the reduced speed is input to third sun gear S3 from first planetary gearset G1. The point identified by B2 in the diagram, or the application point of second brake B2 indicates the application of second brake B2 with which second sun gear S2 is held stationary. The operation of speed-shifting planetary gearset G2 is defined by the lever or straight line connecting the engagement point of first clutch C1 and the application point of second brake B2. The intersection point of the lever and the perpendicular line at output shaft OP1 indicates the output speed. In the third speed, the rotation speed of input shaft IP1 is reduced to a point identified by 3RD in the diagram (faster than the second speed) through the multiple-speed automatic transmission, and output to output shaft OP1.

Figure 4C:
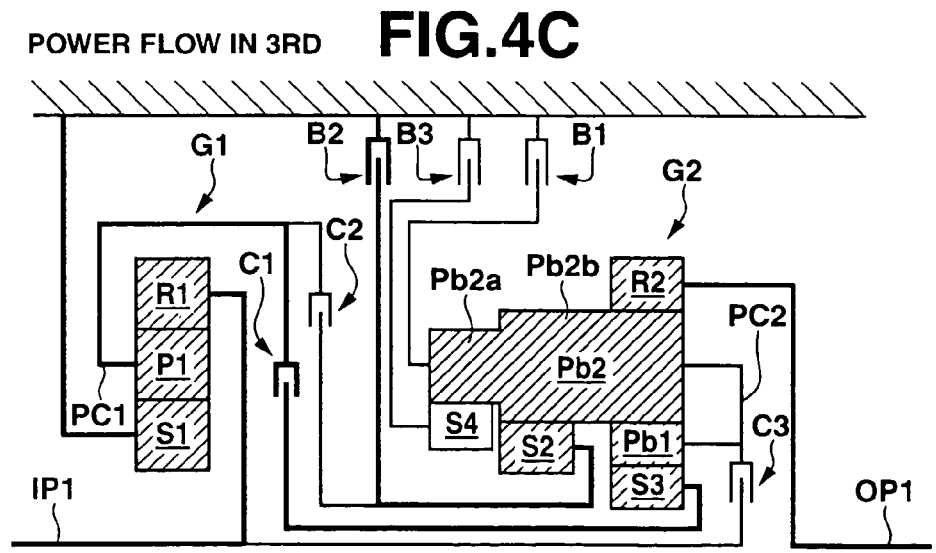
FIG. 4C is a schematic diagram depicting a power flow in the third speed of the multiple-speed automatic transmission of the first embodiment.

The power flow or torque flow in the second speed is shown in FIG. 4C. The power flows through first clutch C1, second brake B2, and the rotating members, as shown by bold lines, and first planetary gearset G1 and speed-shifting planetary gearset G2 except fourth sun gear S4, as shown by a hatch pattern.

The fourth speed is established by releasing second brake B2 and engaging second clutch C2 to the operational state of the third speed, that is, by engaging first clutch C1 and second clutch C2, as shown in FIG. 2. First, the rotation speed of input shaft IP1 is reduced at first planetary gearset G1. At speed-shifting planetary gearset G2, with first clutch C1 engaged, the reduced speed is input to third sun gear S3 from first planet-pinion carrier PC1 of first planetary gearset G1. At the same time, with second clutch C2 engaged, the reduced speed is input to second sun gear S2 from first planet-pinion carrier PC1 of first planetary gearset G1. Accordingly, at speed-shifting planetary gearset G2, third sun gear S3 and second sun gear S2 rotate at the same reduced speed, so that second planet-pinion carrier PC2 and second ring gear R2 also rotate solidly with third sun gear S3 and second sun gear S2. Therefore second ring gear R2 is forced to rotate at the reduced speed that is reduced at first planetary gearset G1, thereby outputs the rotation speed to output shaft OP1.

The collinear diagram of the multiple-speed automatic transmission as shown in FIG. 3 provides another analysis of the fourth speed. The point identified by C1 in the diagram, or the engagement point of first clutch C1 indicates the engagement of first clutch C1 with which the reduced speed is input to third sun gear S3 from first planetary gearset G1. Similarly, the point identified by C2 in the diagram, or the engagement point of second clutch C2 indicates the engagement of second clutch C2 with which the reduced speed is input to second sun gear S2 from first planetary gearset G1. The operation of speed-shifting planetary gearset G2 is defined by the lever or straight line connecting the engagement point of first clutch C1 and the engagement point of second clutch C2. The intersection point of the lever and the perpendicular line at output shaft OP1 indicates the output speed. In the fourth speed, the rotation speed of input shaft IP1 is reduced to a point identified by 4TH in the diagram (to the gear ratio of first planetary gearset G1) through the multiple-speed automatic transmission, and output to output shaft OP1.

The power flow or torque flow in the second speed is shown in FIG. 5A. The power flows through first clutch C1, second clutch C2, and the rotating members, as shown by bold lines, and first planetary gearset G1 and speed-shifting planetary gearset G2 except fourth sun gear S4, as shown by a hatch pattern.

The fifth speed is established by disengaging second clutch C2 and engaging third clutch C3 to the operational state of the fourth speed, that is, by engaging first clutch C1 and third clutch C3, as shown in FIG. 2. First, the rotation speed of input shaft IP1 is reduced at first planetary gearset G1. At speed-shifting planetary gearset G2, with first clutch C1 engaged, the reduced speed is input to third sun gear S3 from first planet-pinion carrier PC1 of first planetary gearset G1. On the other hand, with third clutch C3 engaged, the input rotation of input shaft IP1 is input to second planet-pinion carrier PC2. In this state, third sun gear S3, second planet-pinion carrier PC2 that carries second planet pinion Pb1 and larger-diameter section Pb2b of third planet pinion Pb2, and second ring gear R2 are assumed to form a planetary gearset of the double-pinion type. Therefore, with third sun gear S3 rotating at a speed reduced at first planetary gearset G1 and second planet-pinion carrier PC2 rotating at the input speed, second ring gear R2 is forced to rotate at a speed intermediate between that of third sun gear S3 and that of second planet-pinion carrier PC2, thereby outputs the rotation speed to output shaft OP1.

The collinear diagram of the multiple-speed automatic transmission as shown in FIG. 3 provides another analysis of the fifth speed. The point identified by C1 in the diagram, or the engagement point of first clutch C1 indicates the engagement of first clutch C1 with which the reduced speed is input to third sun gear S3 from first planetary gearset G1. Similarly, the point identified by C3 in the diagram, or the engagement point of third clutch C3 indicates the engagement of third clutch C3 with which the input speed is input to second planet-pinion carrier PC2 from input shaft IP1. The operation of speed-shifting planetary gearset G2 is defined by the lever or straight line connecting the engagement point of first clutch C1 and the engagement point of third clutch C3. The intersection point of the lever and the perpendicular line at output shaft OP1 indicates the output speed. In the fifth speed, the rotation speed of input shaft IP1 is reduced slightly to a point identified by 5TH in the diagram through the multiple-speed automatic transmission, and output to output shaft OP1.

The power flow or torque flow in the fifth speed is shown in FIG. 5B. The power flows through first clutch C1, third clutch C3, and the rotating members, as shown by bold lines, and first planetary gearset G1 and speed-shifting planetary gearset G2 except second sun gear S2 and fourth sun gear S4, as shown by a hatch pattern.

The sixth speed is established by disengaging first clutch C1 and engaging second clutch C2 to the operational state of the fifth speed, that is, by engaging second clutch C2 and third clutch C3, as shown in FIG. 2. First, the rotation speed of input shaft IP1 is reduced at first planetary gearset G1. With second clutch C2 engaged, the reduced speed is input to second sun gear S2 from first planet-pinion carrier PC1 of first planetary gearset G1. At the same time, with third clutch C3 engaged, the input rotation of input shaft IP1 is input to second planet-pinion carrier PC2. Accordingly, in this state, second sun gear S2, second planet-pinion carrier PC2 that carries larger-diameter section Pb2b of third planet pinion Pb2, and second ring gear R2 are assumed to form a planetary gearset of the single-pinion type. Therefore, with second sun gear S2 rotating at a speed reduced at first planetary gearset G1 and second planet-pinion carrier PC2 rotating at the input speed, second ring gear R2 is forced to rotate at a speed increased from the input speed, thereby outputs the rotation speed to output shaft OP1.

The collinear diagram of the multiple-speed automatic transmission as shown in FIG. 3 provides another analysis of the sixth speed. The point identified by C2 in the diagram, or the engagement point of second clutch C2 indicates the engagement of second clutch C2 with which the reduced speed is input to second sun gear S2 from first planetary gearset G1. Similarly, the point identified by C3 in the diagram, or the engagement point of third clutch C3 indicates the engagement of third clutch C3 with which the input speed is input to second planet-pinion carrier PC2 from input shaft IP1. The operation of speed-shifting planetary gearset G2 is defined by the lever or straight line connecting the engagement point of second clutch C2 and the engagement point of third clutch C3. The intersection point of the lever and the perpendicular line at output shaft OP1 indicates the output speed. In the sixth speed, the rotation speed of input shaft IP1 is increased slightly to a point identified by 6TH in the diagram through the multiple-speed automatic transmission, and output to output shaft OP1.

The power flow or torque flow in the sixth speed is shown in FIG. 5C. The power flows through second clutch C2, third clutch C3, and the rotating members, as shown by bold lines, and first planetary gearset G1 and speed-shifting planetary gearset G2 except third sun gear S3, fourth sun gear S4, and second planet pinion Pb1, as shown by a hatch pattern.

The seventh speed is established by disengaging second clutch C2 and applying second brake B2 to the operational state of the sixth speed, that is, by engaging third clutch C3 and applying second brake B2, as shown in FIG. 2. With third clutch C3 engaged, the input rotation speed of input shaft IP1 is input to second planet-pinion carrier PC2 of speed-shifting planetary gearset G2. On the other hand, with second brake B2 applied, second sun gear S2 of speed-shifting planetary gearset G2 is held stationary to the transmission housing. In this state, second sun gear S2, second planet-pinion carrier PC2 that carries larger-diameter section Pb2b of third planet pinion Pb2, and second ring gear R2 are assumed to form a planetary gearset of the single-pinion type with a sun gear fixed. Therefore, with second planet-pinion carrier PC2 rotating at the input speed, second ring gear R2 is forced to rotate at a speed increased faster than the input speed, thereby outputs the rotation speed to output shaft OP1.

The collinear diagram of the multiple-speed automatic transmission as shown in FIG. 3 provides another analysis of the seventh speed. The point identified by C3 in the diagram, or the engagement point of third clutch C3 indicates the engagement of third clutch C3 with which the input speed is input to second planet-pinion carrier PC2 from input shaft IP1. The point identified by B2 in the diagram, or the application point of second brake B2 indicates the application of second brake B2 with which second sun gear S2 is held stationary. The operation of speed-shifting planetary gearset G2 is defined by the lever or straight line connecting the engagement point of third clutch C3 and the application point of second brake B2. The intersection point of the lever and the perpendicular line at output shaft OP1 indicates the output speed. In the seventh speed, the rotation speed of input shaft IP1 is increased to a point identified by 7TH in the diagram through the multiple-speed automatic transmission, and output to output shaft OP1.

Figure 6A:
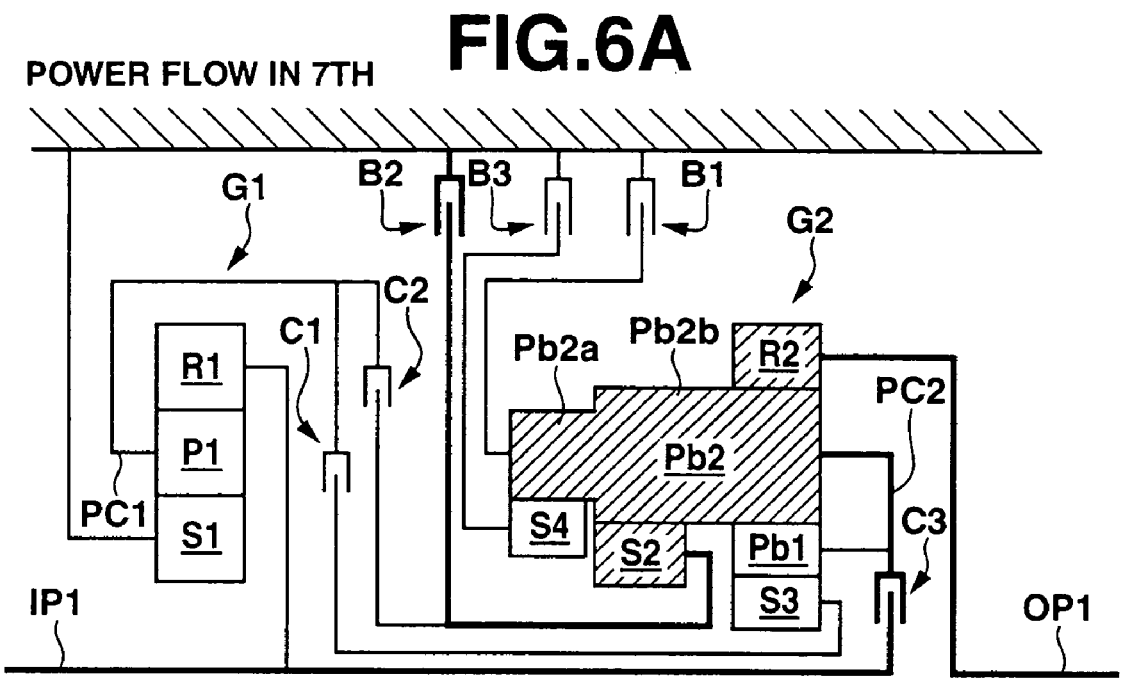
FIG. 6A is a schematic diagram depicting a power flow in the seventh speed of the multiple-speed automatic transmission of the first embodiment.

The power flow or torque flow in the seventh speed is shown in FIG. 6A. The power flows through third clutch C3, second brake B2, and the rotating members, as shown by bold lines, and speed-shifting planetary gearset G2 except third sun gear S3, fourth sun gear S4, and second planet pinion Pb1, as shown by a hatch pattern.

The eighth speed is established by releasing second brake B2 and applying third brake B3 to the operational state of the seventh speed, that is, by engaging third clutch C3 and applying third brake B3, as shown in FIG. 2. With third clutch C3 engaged, the input rotation speed of input shaft IP1 is input to second planet-pinion carrier PC2 of speed-shifting planetary gearset G2. On the other hand, with third brake B3 applied, fourth sun gear S4 of speed-shifting planetary gearset G2 is held stationary to the transmission housing. Fourth sun gear S4, second planet-pinion carrier PC2 that carries third planet pinion Pb2, and second ring gear R2 are assumed to form a planetary gearset of the single-pinion type with a sun gear fixed. Therefore, with second planet-pinion carrier PC2 rotating at the input speed, second ring gear R2 is forced to rotate at a speed increased from the input speed that is faster than the seventh speed according to the difference between gear ratios of second sun gear S2 to larger-diameter section Pb2*b* of third planet pinion Pb2 and fourth sun gear S4 to smaller-diameter section Pb2*a* of third planet pinion Pb2 since fourth sun gear S4 is meshed with smaller-diameter section Pb2*a* of third planet pinion Pb2.

The collinear diagram of the multiple-speed automatic transmission as shown in FIG. 3 provides another analysis of the eighth speed. The point identified by C3 in the diagram, or the engagement point of third clutch C3 indicates the engagement of third clutch C3 with which the input speed is input to second planet-pinion carrier PC2 from input shaft IP1. The point identified by B3 in the diagram, or the application point of third brake B3 indicates the application of third brake B3 with which fourth sun gear S4 is held stationary to the transmission housing. The operation of speed-shifting planetary gearset G2 is defined by the lever or straight line connecting the engagement point of third clutch C3 and the application point of third brake B3. The intersection point of the lever and the perpendicular line at output shaft OP1 indicates the output speed. In the eighth speed, the rotation speed of input shaft IP1 is increased to a point identified by 8TH in the diagram through the multiple-speed automatic transmission, and output to output shaft OP1.

Figure 6B:
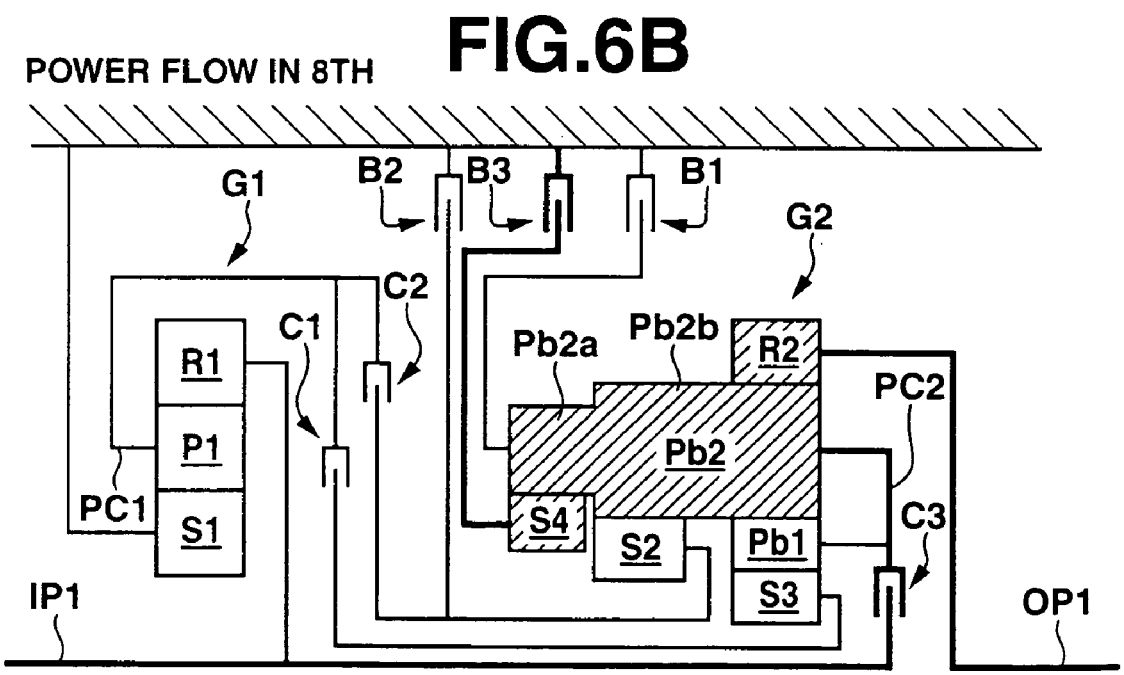
FIG. 6B is a schematic diagram depicting a power flow in the eighth speed of the multiple-speed automatic transmission of the first embodiment.

The power flow or torque flow in the eighth speed is shown in FIG. 6B. The power flows through third clutch C3, third brake B3, and the rotating members, as shown by bold lines, and speed-shifting planetary gearset G2 except second sun gear S2, third sun gear S3, and second planet pinion Pb1, as shown by a hatch pattern.

The first reverse speed is established by engaging second clutch C2 and applying first brake B1, as shown in FIG. 2. First, the rotation speed of input shaft IP1 is reduced at first planetary gearset G1. With second clutch C2 engaged, the reduced speed is input to second sun gear S2 from first planet-pinion carrier PC1 of first planetary gearset G1. On the other hand, with first brake B1 applied, second planet-pinion carrier PC2 is fixed to the transmission housing. In this state, second sun gear S2, second planet-pinion carrier PC2 that carries larger-diameter section Pb2*b* of third planet pinion Pb2, and second ring gear R2 are assumed to form a planetary gearset of the single-pinion type with a planet-pinion carrier fixed. Therefore, with second sun gear S2 rotating at the reduced speed, second ring gear R2 is forced to rotate in the reverse direction at a reduced speed, thereby outputs the rotation speed to output shaft OP1.

The collinear diagram of the multiple-speed automatic transmission as shown in FIG. 3 provides another analysis of the first reverse speed. The point identified by C2 in the diagram, or the engagement point of second clutch C2 indicates the engagement of second clutch C2 with which the reduced speed is input to second sun gear S2 from first planetary gearset G1. The point identified by B1 in the diagram, or the application point of first brake B1 indicates the application of first brake B1 with which second planet-pinion carrier PC2 is held stationary. The operation of speed-shifting planetary gearset G2 is defined by the lever or straight line connecting the engagement point of second clutch C2 and the application point of first brake B1. The intersection point of the lever and the perpendicular line at output shaft OP1 indicates the output speed. In the first reverse speed, the rotation speed of input shaft IP1 is reduced to a point identified by REV1 in the diagram through the multiple-speed automatic transmission, and output to output shaft OP1.

Figure 7A:
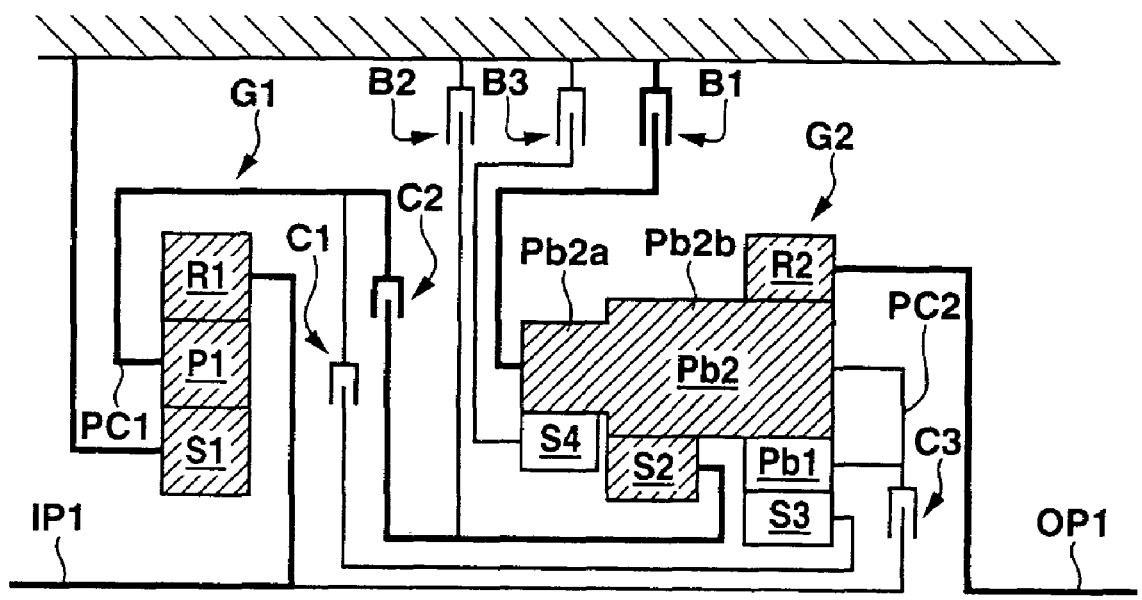
FIG. 7A is a schematic diagram depicting a power flow in the first reverse speed of the multiple-speed automatic transmission of the first embodiment.

The power flow or torque flow in the first reverse speed is shown in FIG. 7A. The power flows through second clutch C2, first brake B1; and the rotating members, as shown by bold lines, and first planetary gearset G1 and speed-shifting planetary gearset G2 except third sun gear S3, fourth sun gear S4, and second planet pinion Pb1, as shown by a hatch pattern.

The second reverse speed is established by releasing first brake B1 and applying third brake B3 to the operational state of the first reverse speed, that is, by engaging second clutch C2 and applying third brake B3, as shown in FIG. 2. First, the rotation speed of input shaft IP1 is reduced at first planetary gearset G1. With second clutch C2 engaged, the reduced speed is input to second sun gear S2 from first planet-pinion carrier PC1 of first planetary gearset GI. On the other hand, with third brake B3 applied, fourth sun gear S4 is fixed to the transmission housing. Fourth sun gear S4, second planet-pinion carrier PC2 that carries third planet pinion Pb2, and second ring gear R2 are assumed to form a planetary gearset. With fourth sun gear S4 fixed and second ring gear R2 rotating at the reduced speed, second planet-pinion carrier PC2 is forced to rotate at a speed reduced from the speed of second ring gear R2. At the same time, second sun gear S2, second planet-pinion carrier PC2 that carries larger-diameter section Pb2*b* of third planet pinion Pb2, and second ring gear R2 are assumed to form a planetary gearset of the single-pinion type with a planet-pinion carrier rotating at a low speed. Therefore, with second sun gear S2 rotating at a speed reduced at first planetary gearset G1, second ring gear R2 is forced to rotate in the reverse direction at a reduced speed (faster than the first reverse speed), thereby outputs the rotation speed to output shaft OP1.

The collinear diagram of the multiple-speed automatic transmission as shown in FIG. 3 provides another analysis of the second reverse speed. The point identified by C2 in the diagram, or the engagement point of second clutch C2 indicates the engagement of second clutch C2 with which the reduced speed is input to second sun gear S2 from first planetary gearset G1. The point identified by B3 in the diagram, or the application point of third brake B3 indicates the application of third brake B3 with which fourth sun gear S4 is held stationary. The operation of speed-shifting planetary gearset G2 is defined by the lever or straight line connecting the engagement point of second clutch C2 and the application point of third brake B3. The intersection point of the lever and the perpendicular line at output shaft OP1 indicates the output speed. In the second reverse speed, the rotation speed of input shaft IP1 is reduced to a point identified by REV2 in the diagram through the multiple-speed automatic transmission, and output to output shaft OP1.

Figure 7B:
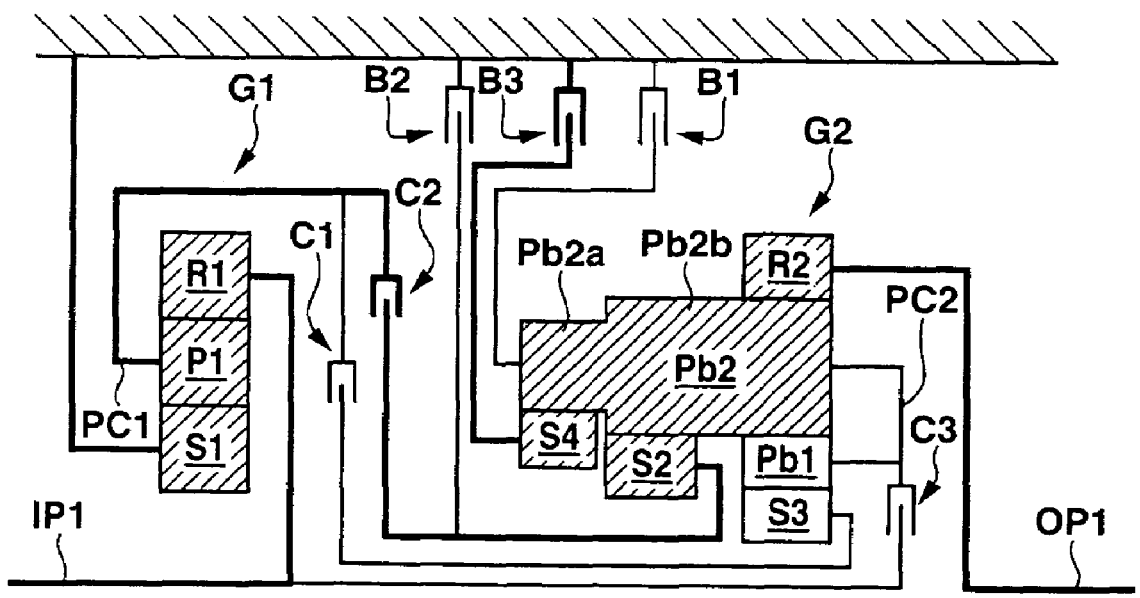
FIG. 7B is a schematic diagram depicting a power flow in the second reverse speed of the multiple-speed automatic transmission of the first embodiment.

The power flow or torque flow in the second reverse speed is shown in FIG. 7B. The power flows through second clutch C2, third brake B3, and the rotating members, as shown by bold lines, and first planetary gearset G1 and speed-shifting planetary gearset G2 except third sun gear S3 and second planet pinion Pb1, as shown by a hatch pattern.

Figure 14:
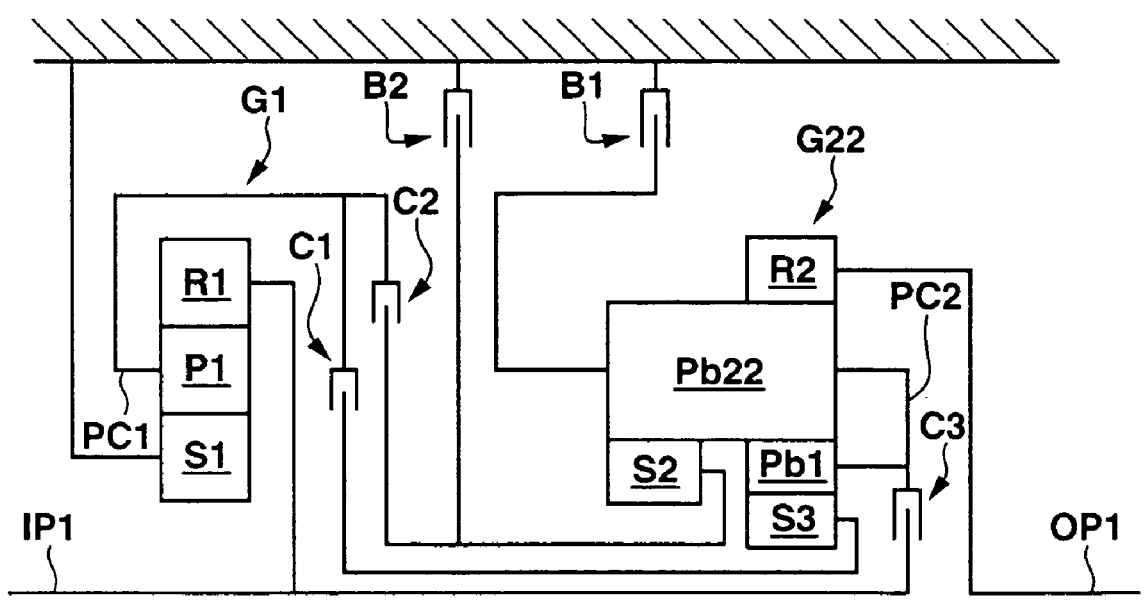
FIG. 14 is a schematic diagram depicting a six-speed automatic transmission as a basic structure for the eight-speed automatic transmission of the first and second embodiments.

The multiple-speed automatic transmission of the first embodiment is constructed and operated as discussed above. The following describes the comparison between the multiple-speed automatic transmission of the first embodiment and the corresponding six-speed automatic transmission that serves for the basic structure of the multiple-speed automatic transmission of the first embodiment. Referring now to FIG. 14, there is shown the six-speed automatic transmission. Elements in common are designated by the same reference signs. The six-speed automatic transmission includes two planetary gearsets of first planetary gearset G1 and speed-shifting planetary gearset G22, three clutches C1 through C3, and two brakes B1 and B2. The difference is that the multiple-speed automatic transmission includes additional elements of fourth sun gear S4 and smaller-diameter section Pb2a of third planet pinion Pb2 meshed with fourth sun gear S4, and third brake B3. In other words, simply adding fourth sun gear S4, smaller-diameter section Pb2a in third planet pinion Pb22, and third brake B3 serves for multiplication of gear speeds from the six-speed automatic transmission to the eight-speed automatic transmission of the first embodiment.

The following describes effects of the first embodiment.

(E1) The eight-speed automatic transmission of the first embodiment is comprised by fourth sun gear S4, smaller-diameter section Pb2a in third planet pinion Pb22, and third brake B3 to the corresponding six-speed automatic transmission. As shown in FIG. 2, a gear speed between the first speed and the second speed of the corresponding six-speed automatic transmission is provided by engaging first clutch C1 and applying third brake B3. In addition, a gear speed faster than the sixth speed of the corresponding six-speed automatic transmission is provided by engaging third clutch C3 and applying third brake B3. In summary, an eight-speed automatic transmission can be provided by applying planetary gearsets with the same gear ratio as the corresponding six-speed automatic transmission, while the gear ratios can be properly set. Addition of the top speed or the eighth speed provides a wider ratio coverage, to improve fuel efficiency, which is an object of multiplication of gear speeds. As shown in FIG. 2, for example, the ratio coverage of the automatic transmission of the first embodiment is increased to 8.13, while the ratio coverage of the six-speed automatic transmission is equal to 6.35. This is derived from the gear ratios of the planetary gearsets. In this example, the gear ratios of $\alpha 1$ or first sun gear S1/first ring gear R1 gear ratio, $\alpha 2$ or second sun gear S2/second ring gear R2 gear ratio, $\alpha 3$ or third sun gear S3/second ring gear R2, and $\alpha 4$ or fourth sun gear S4/second ring gear R2 gear ratio are equal to 0.58, 0.4, 0.35, and 0.60, respectively. In addition, the numbers of teeth of second sun gear S2, larger-diameter section Pb2b, second ring gear R2, fourth sun gear S4, and smaller-diameter section Pb2a are set to 40, 40, 100, 60, and 30, respectively.

(E2) The new second speed is added between the first speed and the second speed of the corresponding six-speed automatic transmission, where torque difference is large, to reduce torque difference and shift shock. As shown in FIG. 2, the difference of gear ratio between the first speed and the second speed of the eight-speed automatic transmission of the first embodiment is equal to 1.63, and the difference between the second and the third is equal to 0.46, while the difference of gear ratio between the first speed and the second speed of the corresponding six-speed automatic transmission is equal to 2.09. Accordingly, this provides smoother shifting from the first speed to the second speed. On the other hand, addition of the new second speed leads to lowering the minimum speed for lock-up, to improve fuel efficiency. In general, the first speed is used during starting from a stationary state, without lock-up, from the viewpoint of fail-safe operation. In other words, decreasing the second speed that usually determines the minimum speed for lock-up, or increasing the gear ratio of the second leads to a low minimum speed for lock-up and improvement of fuel efficiency.

(E3) An additional reverse speed faster than the reverse speed of the corresponding six-speed automatic transmission is provided. The new reverse speed is established by engaging second clutch C2 and applying third brake B3, as discussed above.

Figure 8:
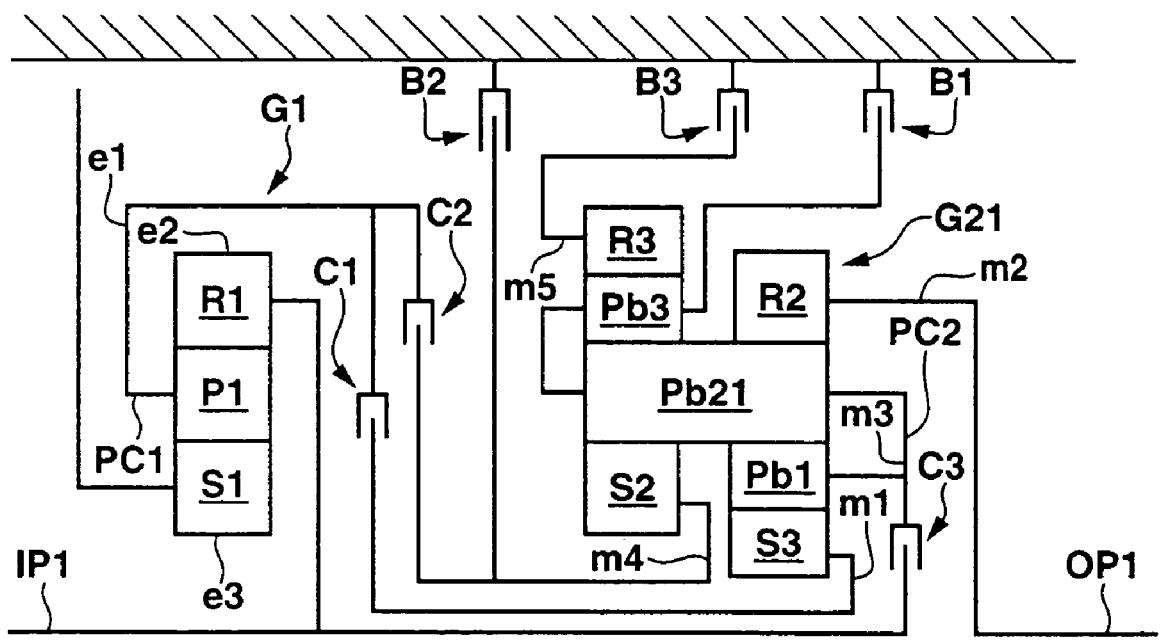
FIG. 8 is a schematic diagram depicting a multiple-speed automatic transmission for an automotive vehicle of a second embodiment.

Referring now to FIG. 8, there is shown a multiple-speed automatic transmission for an automotive vehicle of a second embodiment of the present invention. The multiple-speed automatic transmission provides eight forward speeds and two reverse speeds. The multiple-speed automatic transmission includes a first planetary gearset G1 at the left, and a speed-shifting planetary gearset G21 at the right arranged along the axis. First planetary gearset G1 is of the single-pinion type, to serve for a speed-reducing planetary gearset as a speed-reducing unit. Speed-shifting planetary gearset G21 is a compound planetary gearset.

First planetary gearset G1, which is of the single-pinion type, consists of a first sun gear S1, a first ring gear R1, and a first planet-pinion carrier PC1 that carries or rotatably supports a first planet pinion P1 meshed with both first sun gear S1 and first ring gear R1. First sun gear S1 as a third rotating element e3 is continuously held against rotation to a transmission housing. First planet-pinion carrier PCI serves for a first rotating element e1 of first planetary gearset G1 with a first primary speed slower than that of first ring gear R1 that serves for a second rotating element e2 of first planetary gearset G1.

Speed-shifting planetary gearset G21 consists of two sun gears of a second sun gear S2 and a third sun gear S3, two ring gears of a second ring gear R2 and a third ring gear R3, and a second planet-pinion carrier PC2 that carries or rotatably supports three planet pinions of a second planet pinion Pb1, a third planet pinion Pb21, and a fourth planet pinion Pb3. Second planet pinion Pb1 is meshed with third sun gear S3 and third planet pinion Pb21. Third planet pinion Pb21 is meshed with second sun gear S2, second ring gear R2, and fourth planet pinion Pb3. Fourth planet pinion Pb3 is meshed with third ring gear R3. Third planet pinion Pb21 in the second embodiment has a single outside diameter and a single number of teeth, while third planet pinion Pb2 in the first embodiment is formed of a two-stepped cylindrical shape.

Speed-shifting planetary gearset G21 includes five rotating members. A first rotating member m1 consists of elements that rotate solidly with third sun gear S3. A second rotating member m2 consists of elements that rotate solidly with second ring gear R2. A third rotating member m3 consists of elements that rotate solidly with second planet-pinion carrier PC2. A fourth rotating member m4 consists of elements that rotate solidly with second sun gear S2. A fifth rotating member m5 consists of elements that rotate solidly with third ring gear R3.

The aforementioned structure is connected to an input section, such as an input shaft IP1 and an output section, such as an output shaft OP1. Input shaft IP1 is drivingly connected to first ring gear R1, to input driving torque transmitted via a torque converter (not shown) and others from an engine (not shown) as a drive source. Output shaft OP1 is drivingly connected to second ring gear R2, to output driving torque via a final gear (not shown) and others to a driving wheel (not shown).

Additionally, the multiple-speed automatic transmission includes three clutches and three brakes. A first clutch C1 selectively connects or disconnects first planet-pinion carrier PC1 and third sun gear S3 (first rotating member m1). A second clutch C2 selectively connects or disconnects first planet-pinion carrier PC1 and second sun gear S2 (fourth rotating member m4). A third clutch C3 selectively connects or disconnects input shaft IP1 and second planet-pinion carrier PC2 (third rotating member m3). A first brake B1 is operable to selectively hold against rotation to the transmission housing or release second planet-pinion carrier PC2 (third rotating member m3). A second brake B2 is operable to selectively hold against rotation to the transmission housing or release second sun gear S2 (fourth rotating member m4). A third brake B3 is operable to selectively hold against rotation to the transmission housing or release third ring gear R3 (fifth rotating member m5).

Figure 9:
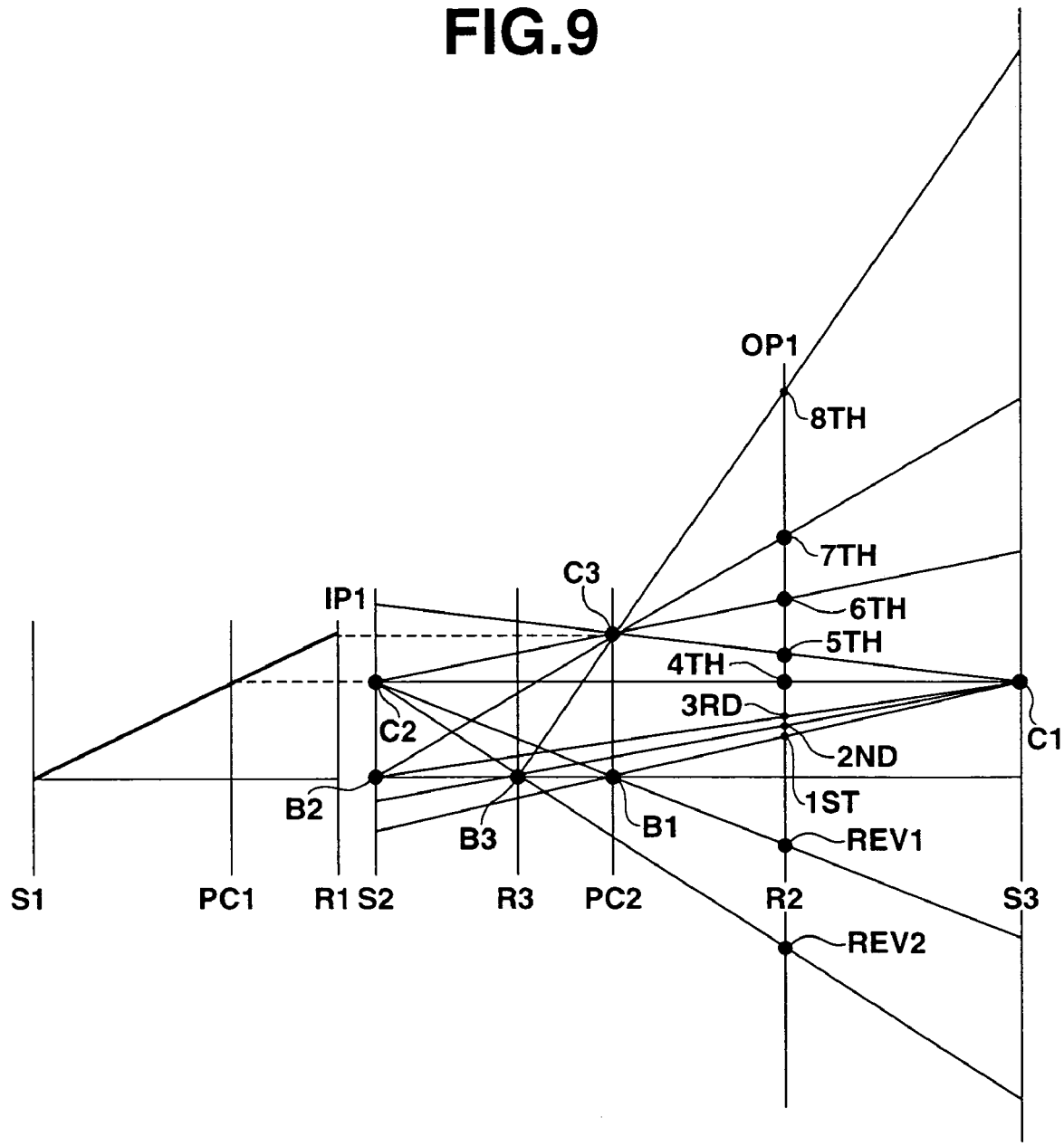
FIG. 9 is a collinear diagram of the multiple-speed automatic transmission of the second embodiment.

Referring now to FIGS. 2 and 9 through 13B, the following describes the operation of the multiple-speed automatic transmission of the first embodiment. FIG. 2, partly shared between the first and second embodiments, shows clutch engagements and brake applications required to establish various gear speeds. In FIG. 2, a solid circle in a cell indicates that the corresponding clutch or brake is applied in the corresponding speed, and a blank indicates that the corresponding clutch or brake is released in the corresponding speed. FIG. 9 shows the collinear diagram of the multiple-speed automatic transmission. The collinear diagram shows the rotation states of the rotating members in each speed. In FIG. 9, a bold line indicates the collinear diagram of first planetary gearset G1, and medium bold lines indicate the collinear diagram of speed-shifting planetary gearset G21. Speed-shifting planetary gearset G21 gearset takes a rotation state determined by a combination of rotations of two of the five rotating members, where each of the five rotating members of speed-shifting planetary gearset G21 has a rotation speed that monotonously varies in order of first rotating member m1, second rotating member m2, third rotating member m3, fifth rotating member m5, and fourth rotating member m4. FIGS. 10A to 13B show the power flow or the torque flow in each speed. In FIGS. 10A to 13B, the power flow through the clutches, the brakes, and the rotating members is indicated by bold lines, the power flow through the gears is indicated by a hatch pattern.

The first speed is established by engaging first clutch C1 and applying first brake B1, as shown in FIG. 2. First, the rotation speed of input shaft IP1 is reduced at first planetary gearset G1. At speed-shifting planetary gearset G21, with first clutch C1 engaged, the reduced speed is input to third sun gear S3 from first planet-pinion carrier PC1 of first planetary gearset G1. On the other hand, with first brake B1 applied, second planet-pinion carrier PC2 is fixed to the transmission housing. In this state, third sun gear S3, second planet-pinion carrier PC2 that carries second planet pinion Pb1 and third planet pinion Pb21, and second ring gear R2 are assumed to form a planetary gearset of the double-pinion type with a planet-pinion carrier fixed. Therefore, with third sun gear S3 rotating at a speed reduced at first planetary gearset G1, second ring gear R2 is forced to rotate at a further reduced speed, thereby outputs the rotation speed to output shaft OP1.

The collinear diagram of the multiple-speed automatic transmission as shown in FIG. 9 provides another analysis of the first speed. The point identified by C1 in the diagram, or the engagement point of first clutch C1 indicates the engagement of first clutch C1 with which the reduced speed is input to third sun gear S3 from first planetary gearset G1. The point identified by B1 in the diagram, or the application point of first brake B1 indicates the application of first brake B1 with which second planet-pinion carrier PC2 is held stationary. The operation of speed-shifting planetary gearset G21 is defined by the lever or straight line connecting the engagement point of first clutch C1 and the application point of first brake B1. The intersection point of the lever and the perpendicular line at output shaft OP1 indicates the output speed. In the first speed, the rotation speed of input shaft IP1 is reduced to a point identified by 1ST in the diagram through the multiple-speed automatic transmission, and output to output shaft OP1.

Figure 10A:
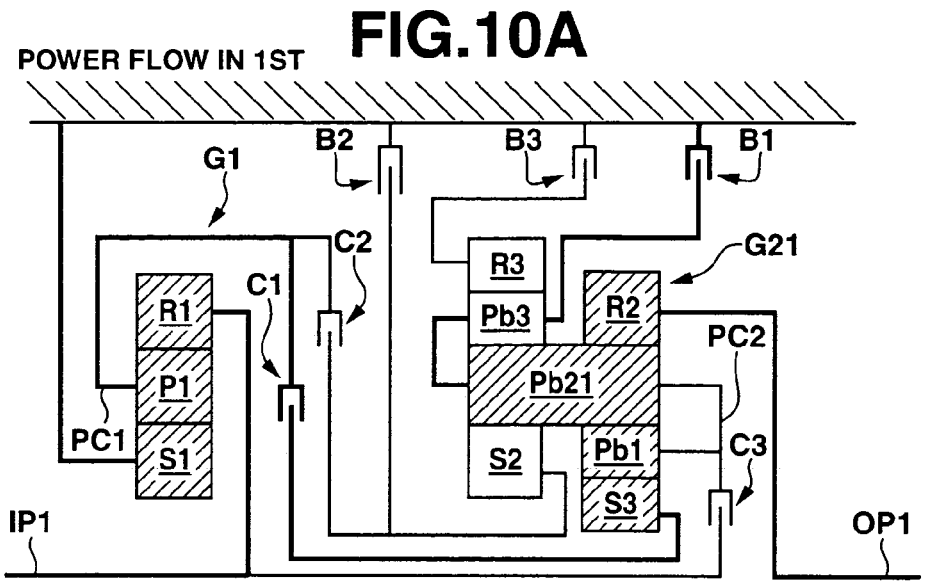
FIG. 10A is a schematic diagram depicting a power flow in the first speed of the multiple-speed automatic transmission of the second embodiment.

The power flow or torque flow in the first speed is shown in FIG. 10A. The power flows through first clutch C1, first brake B1, and the rotating members, as shown by bold lines, and first planetary gearset G1, and speed-shifting planetary gearset G21 except second sun gear S2, fourth planet pinion Pb3, and third ring gear R3, as shown by a hatch pattern.

The second speed is established by releasing first brake B1 and applying third brake B3 to the operational state of the first speed, that is, by engaging first clutch C1 and applying third brake B3, as shown in FIG. 2. First, the rotation speed of input shaft IP1 is reduced at first planetary gearset G1. At speed-shifting planetary gearset G21, with first clutch C1 engaged, the reduced speed is input to third sun gear S3 from first planet-pinion carrier PC1 of first planetary gearset G1. On the other hand, with third brake B3 applied, third ring gear R3 is fixed to the transmission housing. With third ring gear R3 fixed and third sun gear S3 rotating at the reduced speed, second planet-pinion carrier PC2 is forced to rotate at a speed further decreased from that of third sun gear S3. At the same time, third sun gear S3, second planet-pinion carrier PC2 that carries second planet pinion Pb1 and third planet pinion Pb21, and second ring gear R2 are assumed to form a planetary gearset of the double-pinion type with a planet-pinion carrier rotating at a low speed. Therefore, with third sun gear S3 rotating at a speed reduced at first planetary gearset G1, second ring gear R2 is forced to rotate at a further reduced speed (faster than the first speed), thereby outputs the rotation speed to output shaft OP1.

The collinear diagram of the multiple-speed automatic transmission as shown in FIG. 9 provides another analysis of the second speed. The point identified by C1 in the diagram, or the engagement point of first clutch C1 indicates the engagement of first clutch C1 with which the reduced speed is input to third sun gear S3 from first planetary gearset G1. The point identified by B3 in the diagram, or the application point of third brake B3 indicates the application of third brake B3 with which third ring gear R3 is held stationary. The operation of speed-shifting planetary gearset G21 is defined by the lever or straight line connecting the engagement point of first clutch C1 and the application point of third brake B3. The intersection point of the lever and the perpendicular line at output shaft OP1 indicates the output speed. In the second speed, the rotation speed of input shaft IP1 is reduced to a point identified by 2ND in the diagram through the multiple-speed automatic transmission, and output to output shaft OP1.

Figure 10B:
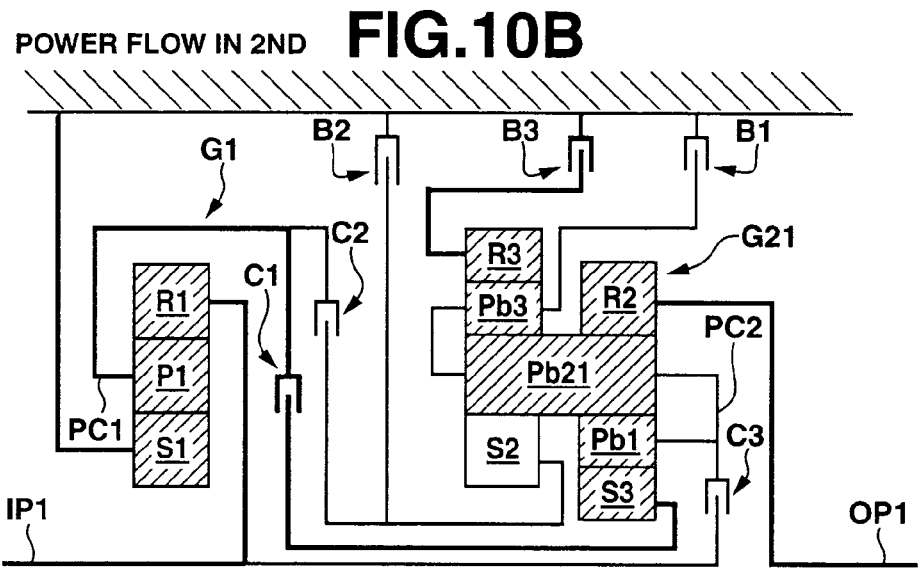
FIG. 10B is a schematic diagram depicting a power flow in the second speed of the multiple-speed automatic transmission of the second embodiment.

The power flow or torque flow in the second speed is shown in FIG. 10B. The power flows through first clutch C1, third brake B3, and the rotating members, as shown by bold lines, first planetary gearset G1 and speed-shifting planetary gearset G21 except second sun gear S2, as shown by a hatch pattern. In this speed, first planetary gearset G1 and speed-shifting planetary gearset G21 serve for the transmission of power and torque.

The third speed is established by releasing third brake B3 and applying second brake B2 to the operational state of the second speed, that is, by engaging first clutch C1 and applying second brake B2, as shown in FIG. 2. First, the rotation speed of input shaft IP1 is reduced at first planetary gearset G1. At speed-shifting planetary gearset G21, with first clutch C1 engaged, the reduced speed is input to third sun gear S3 from first planet-pinion carrier PC1 of first planetary gearset G1. On the other hand, with second brake B2 applied, second sun gear S2 is fixed to the transmission housing. In this state, second sun gear S2, second planet-pinion carrier PC2 that carries third planet pinion Pb21, and second ring gear R2 are assumed to form a planetary gearset of the single-pinion type with a sun gear fixed. With second sun gear S2 fixed and second ring gear R2 rotating, second planet-pinion carrier PC2 is forced to rotate at a speed reduced from the speed of second ring gear R2. At the same time, third sun gear S3, second planet-pinion carrier PC2 that carries second planet pinion Pb1 and third planet pinion Pb21, and second ring gear R2 are assumed to form a planetary gearset of the double-pinion type with a planet-pinion carrier rotating at a low speed. Therefore, with third sun gear S3 rotating at a speed reduced at first planetary gearset G1, second ring gear R2 is forced to rotate at a further reduced speed (faster than the second speed), thereby outputs the rotation speed to output shaft OP1.

The collinear diagram of the multiple-speed automatic transmission as shown in FIG. 9 provides another analysis of the third speed. The point identified by C1 in the diagram, or the engagement point of first clutch C1 indicates the engagement of first clutch C1 with which the reduced speed is input to third sun gear S3 from first planetary gearset G1. The point identified by B2 in the diagram, or the application point of second brake B2 indicates the application of second brake B2 with which second sun gear S2 is held stationary. The operation of speed-shifting planetary gearset G21 is defined by the lever or straight line connecting the engagement point of first clutch C1 and the application point of second brake B2. The intersection point of the lever and the perpendicular line at output shaft OP1 indicates the output speed. In the third speed, the rotation speed of input shaft IP1 is reduced to a point identified by 3RD in the diagram (faster than the second speed) through the multiple-speed automatic transmission, and output to output shaft OP1.

Figure 10C:
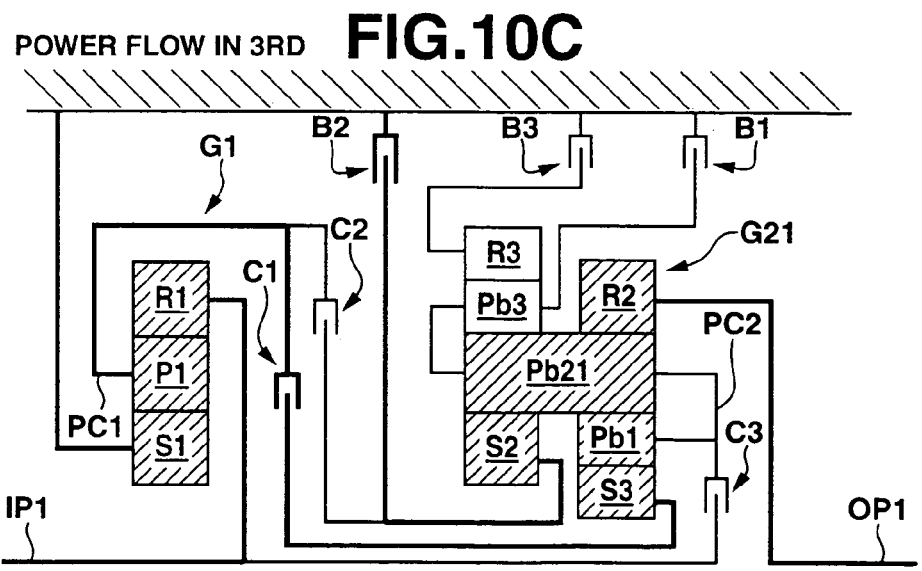
FIG. 10C is a schematic diagram depicting a power flow in the third speed of the multiple-speed automatic transmission of the second embodiment.

The power flow or torque flow in the second speed is shown in FIG. 10C. The power flows through first clutch C1, second brake B2, and the rotating members, as shown by bold lines, and first planetary gearset G1 and speed-shifting planetary gearset G21 except fourth planet pinion Pb3 and third ring gear R3, as shown by a hatch pattern.

The fourth speed is established by releasing second brake B2 and engaging second clutch C2 to the operational state of the third speed, that is, by engaging first clutch C1 and second clutch C2, as shown in FIG. 2. First, the rotation speed of input shaft IP1 is reduced at first planetary gearset G1. At speed-shifting planetary gearset G21, with first clutch C1 engaged, the reduced speed is input to third sun gear S3 from first planet-pinion carrier PC1 of first planetary gearset G1. At the same time, with second clutch C2 engaged, the reduced speed is input to second sun gear S2 from first planet-pinion carrier PC1 of first planetary gearset G1. Accordingly, at speed-shifting planetary gearset G21, third sun gear S3 and second sun gear S2 rotate at the same reduced speed, so that second planet-pinion carrier PC2 and second ring gear R2 also rotate solidly with third sun gear S3 and second sun gear S2. Therefore second ring gear R2 is forced to rotate at the reduced speed that is reduced at first planetary gearset G1, thereby outputs the rotation speed to output shaft OP1.

The collinear diagram of the multiple-speed automatic transmission as shown in FIG. 9 provides another analysis of the fourth speed. The point identified by C1 in the diagram, or the engagement point of first clutch C1 indicates the engagement of first clutch C1 with which the reduced speed is input to third sun gear S3 from first planetary gearset G1. Similarly, the point identified by C2 in the diagram, or the engagement point of second clutch C2 indicates the engagement of second clutch C2 with which the reduced speed is input to second sun gear S2 from first planetary gearset G1. The operation of speed-shifting planetary gearset G21 is defined by the lever or straight line connecting the engagement point of first clutch C1 and the engagement point of second clutch C2. The intersection point of the lever and the perpendicular line at output shaft OP1 indicates the output speed. In the fourth speed, the rotation speed of input shaft IP1 is reduced to a point identified by 4TH in the diagram (to the gear ratio of first planetary gearset G1) through the multiple-speed automatic transmission, and output to output shaft OP1.

The power flow or torque flow in the second speed is shown in FIG. 11A. The power flows through first clutch C1, second clutch C2, and the rotating members, as shown by bold lines, and first planetary gearset G1 and speed-shifting planetary gearset G21 except fourth planet pinion Pb3 and third ring gear R3, as shown by a hatch pattern.

The fifth speed is established by disengaging second clutch C2 and engaging third clutch C3 to the operational state of the fourth speed, that is, by engaging first clutch C1 and third clutch C3, as shown in FIG. 2. First, the rotation speed of input shaft IP1 is reduced at first planetary gearset G1. At speed-shifting planetary gearset G21, with first clutch C1 engaged, the reduced speed is input to third sun gear S3 from first planet-pinion carrier PC1 of first planetary gearset G1. On the other hand, with third clutch C3 engaged, the input rotation of input shaft IP1 is input to second planet-pinion carrier PC2. Accordingly, in this state, third sun gear S3, second planet-pinion carrier PC2 that carries second planet pinion Pb1 and third planet pinion Pb21, and second ring gear R2 are assumed to form a planetary gearset of the double-pinion type. Therefore, with third sun gear S3 rotating at a speed reduced at first planetary gearset G1 and second planet-pinion carrier PC2 rotating at the input speed, second ring gear R2 is forced to rotate at a speed intermediate between that of third sun gear S3 and that of second planet-pinion carrier PC2, thereby outputs the rotation speed to output shaft OP1.

The collinear diagram of the multiple-speed automatic transmission as shown in FIG. 9 provides another analysis of the fifth speed. The point identified by C1 in the diagram, or the engagement point of first clutch C1 indicates the engagement of first clutch C1 with which the reduced speed is input to third sun gear S3 from first planetary gearset G1. Similarly, the point identified by C3 in the diagram, or the engagement point of third clutch C3 indicates the engagement of third clutch C3 with which the input speed is input to second planet-pinion carrier PC2 from input shaft IP1. The operation of speed-shifting planetary gearset G21 is defined by the lever or straight line connecting the engagement point of first clutch C1 and the engagement point of third clutch C3. The intersection point of the lever and the perpendicular line at output shaft OP1 indicates the output speed. In the fifth speed, the rotation speed of input shaft IP1 is reduced slightly to a point identified by 5TH in the diagram through the multiple-speed automatic transmission, and output to output shaft OP1.

The power flow or torque flow in the fifth speed is shown in FIG. 11B. The power flows through first clutch C1, third clutch C3, and the rotating members, as shown by bold lines, and first planetary gearset G1 and speed-shifting planetary gearset G21 except second sun gear S2, fourth planet pinion Pb3 and third ring gear R3, as shown by a hatch pattern.

The sixth speed is established by disengaging first clutch C1 and engaging second clutch C2 to the operational state of the fifth speed, that is, by engaging second clutch C2 and third clutch C3, as shown in FIG. 2. First, the rotation speed of input shaft IP1 is reduced at first planetary gearset G1. With second clutch C2 engaged, the reduced speed is input to second sun gear S2 from first planet-pinion carrier PC1 of first planetary gearset G1. At the same time, with third clutch C3 engaged, the input rotation of input shaft IP1 is input to second planet-pinion carrier PC2. In this state, second sun gear S2, second planet-pinion carrier PC2 that carries third planet pinion Pb21, and second ring gear R2 are assumed to form a planetary gearset of the single-pinion type. Therefore, with second sun gear S2 rotating at a speed reduced at first planetary gearset G1 and second planet-pinion carrier PC2 rotating at the input speed, second ring gear R2 is forced to rotate at a speed increased from the input speed, thereby outputs the rotation speed to output shaft OP1.

The collinear diagram of the multiple-speed automatic transmission as shown in FIG. 9 provides another analysis of the sixth speed. The point identified by C2 in the diagram, or the engagement point of second clutch C2 indicates the engagement of second clutch C2 with which the reduced speed is input to second sun gear S2 from first planetary gearset G1. Similarly, the point identified by C3 in the diagram, or the engagement point of third clutch C3 indicates the engagement of third clutch C3 with which the input speed is input to second planet-pinion carrier PC2 from input shaft IP1. The operation of speed-shifting planetary gearset G21 is defined by the lever or straight line connecting the engagement point of second clutch C2 and the engagement point of third clutch C3. The intersection point of the lever and the perpendicular line at output shaft OP1 indicates the output speed. In the sixth speed, the rotation speed of input shaft IP1 is increased slightly to a point identified by 6TH in the diagram through the multiple-speed automatic transmission, and output to output shaft OP1.

The power flow or torque flow in the sixth speed is shown in FIG. 1C. The power flows through second clutch C2, third clutch C3, and the rotating members, as shown by bold lines, and first planetary gearset G1 and speed-shifting planetary gearset G21 except third sun gear S3, second planet pinion Pb1, fourth planet pinion Pb3, and third ring gear R3, as shown by a hatch pattern.

The seventh speed is established by disengaging second clutch C2 and applying second brake B2 to the operational state of the sixth speed, that is, by engaging third clutch C3 and applying second brake B2, as shown in FIG. 2. With third clutch C3 engaged, the input rotation speed of input shaft IP1 is input to second planet-pinion carrier PC2 of speed-shifting planetary gearset G21. On the other hand, with second brake B2 applied, second sun gear S2 of speed-shifting planetary gearset G21 is held stationary to the transmission housing. In this state, second sun gear S2, second planet-pinion carrier PC2 that carries third planet pinion Pb21, and second ring gear R2 are assumed to form a planetary gearset of the single-pinion type with a sun gear fixed. Therefore, with second planet-pinion carrier PC2 rotating at the input speed, second ring gear R2 is forced to rotate at a speed increased faster than the input speed, thereby outputs the rotation speed to output shaft OP1.

The collinear diagram of the multiple-speed automatic transmission as shown in FIG. 9 provides another analysis of the seventh speed. The point identified by C3 in the diagram, or the engagement point of third clutch C3 indicates the engagement of third clutch C3 with which the input speed is input to second planet-pinion carrier PC2 from input shaft IP1. The point identified by B2 in the diagram, or the application point of second brake B2 indicates the application of second brake B2 with which second sun gear S2 is held stationary. The operation of speed-shifting planetary gearset G21 is defined by the lever or straight line connecting the engagement point of third clutch C3 and the application point of second brake B2. The intersection point of the lever and the perpendicular line at output shaft OP1 indicates the output speed. In the seventh speed, the rotation speed of input shaft IP1 is increased to a point identified by 7TH in the diagram through the multiple-speed automatic transmission, and output to output shaft OP1.

The power flow or torque flow in the seventh speed is shown in FIG. 12A. The power flows through third clutch C3, second brake B2, and the rotating members, as shown by bold lines, and speed-shifting planetary gearset G21 except third sun gear S3, second planet pinion Pb1, fourth planet pinion Pb3, and third ring gear R3, as shown by a hatch pattern.

The eighth speed is established by releasing second brake B2 and applying third brake B3 to the operational state of the seventh speed, that is, by engaging third clutch C3 and applying third brake B3, as shown in FIG. 2. With third clutch C3 engaged, the input rotation speed of input shaft IP1 is input to second planet-pinion carrier PC2 of speed-shifting planetary gearset G21. On the other hand, with third brake B3 applied, third ring gear R3 of speed-shifting planetary gearset G21 is held stationary to the transmission housing. The rotation of third planet pinion Pb21 is defined by the rotations of second planet-pinion carrier PC2 and third ring gear R3 via fourth planet pinion Pb3. Therefore, second ring gear R2 is forced to rotate at a speed defined and increased by the rotations of second planet-pinion carrier PC2 and third planet pinion Pb21.

The collinear diagram of the multiple-speed automatic transmission as shown in FIG. 9 provides another analysis of the eighth speed. The point identified by C3 in the diagram, or the engagement point of third clutch C3 indicates the engagement of third clutch C3 with which the input speed is input to second planet-pinion carrier PC2 from input shaft IP1. The point identified by B3 in the diagram, or the application point of third brake B3 indicates the application of third brake B3 with which third ring gear R3 is held stationary to the transmission housing. The operation of speed-shifting planetary gearset G21 is defined by the lever or straight line connecting the engagement point of third clutch C3 and the application point of third brake B3. The intersection point of the lever and the perpendicular line at output shaft OP1 indicates the output speed. In the eighth speed, the rotation speed of input shaft IP1 is increased to a point identified by 8TH in the diagram through the multiple-speed automatic transmission, and output to output shaft OP1.

The power flow or torque flow in the eighth speed is shown in FIG. 12B. The power flows through third clutch C3, third brake B3, and the rotating members, as shown by bold lines, and speed-shifting planetary gearset G21 except second sun gear S2, third sun gear S3, and second planet pinion Pb1, as shown by a hatch pattern.

The first reverse speed is established by engaging second clutch C2 and applying first brake B1, as shown in FIG. 2. First, the rotation speed of input shaft IP1 is reduced at first planetary gearset G1. With second clutch C2 engaged, the reduced speed is input to second sun gear S2 from first planet-pinion carrier PC1 of first planetary gearset G1. On the other hand, with first brake B1 applied, second planet-pinion carrier PC2 is fixed to the transmission housing. Second sun gear S2, second planet-pinion carrier PC2 that carries third planet pinion Pb21, and second ring gear R2 are assumed to form a planetary gearset of the single-pinion type with a planet-pinion carrier fixed. Therefore, with second sun gear S2 rotating at the reduced speed, second ring gear R2 is forced to rotate in the reverse direction at a reduced speed, thereby outputs the rotation speed to output shaft OP1.

The collinear diagram of the multiple-speed automatic transmission as shown in FIG. 9 provides another analysis of the first reverse speed. The point identified by C2 in the diagram, or the engagement point of second clutch C2 indicates the engagement of second clutch C2 with which the reduced speed is input to second sun gear S2 from first planetary gearset G1. The point identified by B1 in the diagram, or the application point of first brake B1 indicates the application of first brake B1 with which second planet-pinion carrier PC2 is held stationary. The operation of speed-shifting planetary gearset G21 is defined by the lever or straight line connecting the engagement point of second clutch C2 and the application point of first brake B1. The intersection point of the lever and the perpendicular line at output shaft OP1 indicates the output speed. In the first reverse speed, the rotation speed of input shaft IP1 is reduced to a point identified by REV1 in the diagram through the multiple-speed automatic transmission, and output to output shaft OP1.

Figure 13A:
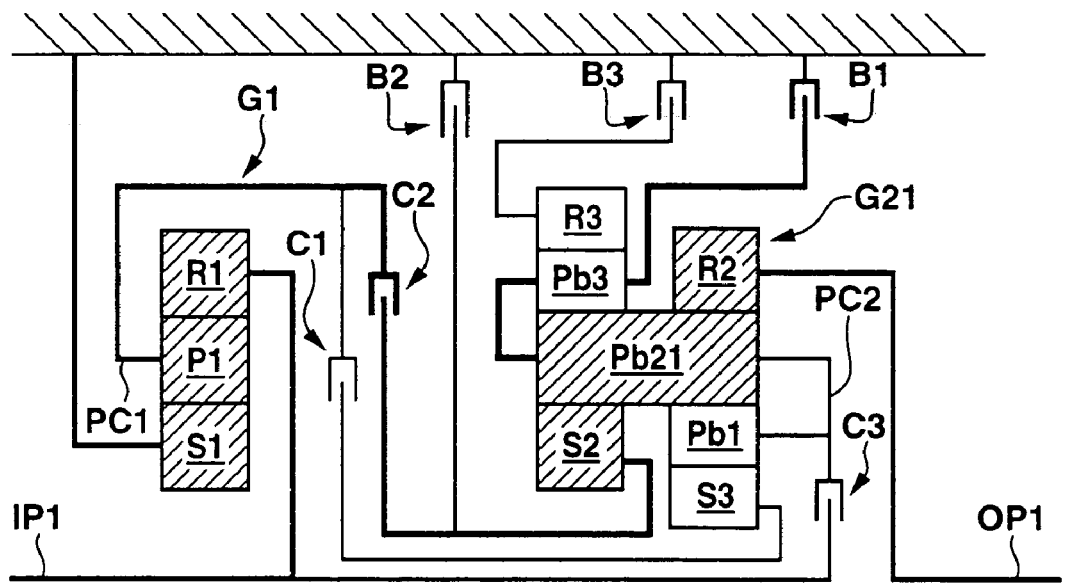
FIG. 13A is a schematic diagram depicting a power flow in the first reverse speed of the multiple-speed automatic transmission of the second embodiment.

The power flow or torque flow in the first reverse speed is shown in FIG. 13A. The power flows through second clutch C2, first brake B1, and the rotating members, as shown by bold lines, and first planetary gearset G1 and speed-shifting planetary gearset G21 except third sun gear S3, second planet pinion Pb1, fourth planet pinion Pb3, and third ring gear R3, as shown by a hatch pattern.

The second reverse speed is established by releasing first brake B1 and applying third brake B3 to the operational state of the first reverse speed, that is, by engaging second clutch C2 and applying third brake B3, as shown in FIG. 2. First, the rotation speed of input shaft IP1 is reduced at first planetary gearset G1. With second clutch C2 engaged, the reduced speed is input to second sun gear S2 from first planet-pinion carrier PC1 of first planetary gearset G1. On the other hand, with third brake B3 applied, third ring gear R3 is fixed to the transmission housing. In this state, second sun gear S2, second planet-pinion carrier PC2 that carries third planet pinion Pb21 and fourth planet pinion Pb3, and third ring gear R3 are assumed to form a planetary gearset of the double-pinion type with a ring gear fixed. With third ring gear R3 fixed and second sun gear S2 rotating at the reduced speed, second planet-pinion carrier PC2 is forced to rotate in the reverse direction at a speed reduced from the speed of second sun gear S2. At the same time, second sun gear S2, second planet-pinion carrier PC2 that carries third planet pinion Pb21, and second ring gear R2 are assumed to form a planetary gearset of the single-pinion type with a planet-pinion carrier rotating at a low speed. Therefore, with second sun gear S2 rotating at a speed reduced at first planetary gearset G1, second ring gear R2 is forced to rotate in the reverse direction at a reduced speed (faster than the first reverse speed), thereby outputs the rotation speed to output shaft OP1.

The collinear diagram of the multiple-speed automatic transmission as shown in FIG. 9 provides another analysis of the second reverse speed. The point identified by C2 in the diagram, or the engagement point of second clutch C2 indicates the engagement of second clutch C2 with which the reduced speed is input to second sun gear S2 from first planetary gearset G1. The point identified by B3 in the diagram, or the application point of third brake B3 indicates the application of third brake B3 with which third ring gear R3 is held stationary. The operation of speed-shifting planetary gearset G21 is defined by the lever or straight line connecting the engagement point of second clutch C2 and the application point of third brake B3. The intersection point of the lever and the perpendicular line at output shaft OP1 indicates the output speed. In the second reverse speed, the rotation speed of input shaft IP1 is reduced to a point identified by REV2 in the diagram through the multiple-speed automatic transmission, and output to output shaft OP1.

Figure 13B:
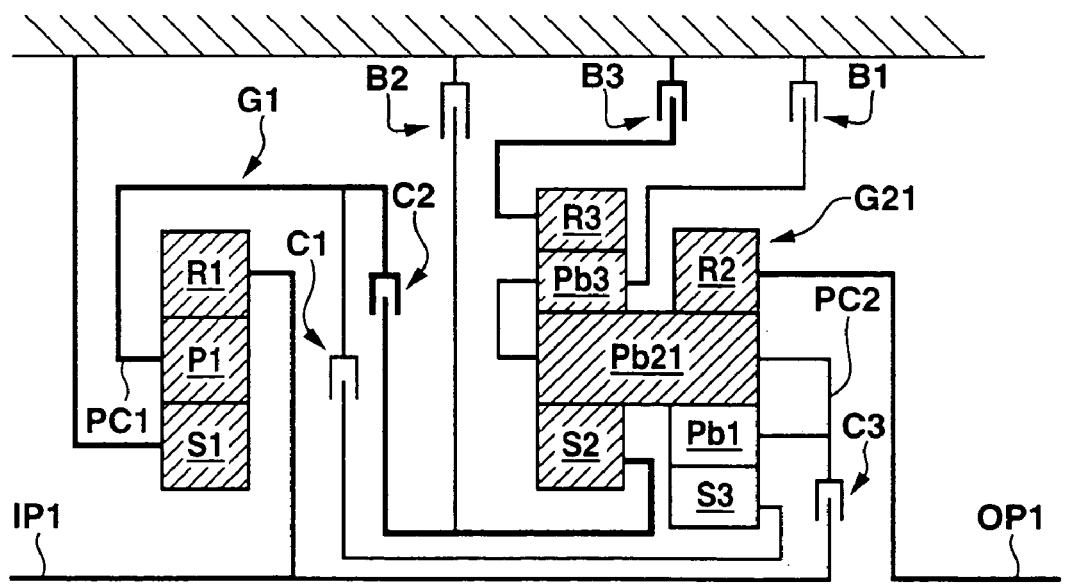
FIG. 13B is a schematic diagram depicting a power flow in the second reverse speed of the multiple-speed automatic transmission of the second embodiment.

The power flow or torque flow in the second reverse speed is shown in FIG. 13B. The power flows through second clutch C2, third brake B3, and the rotating members, as shown by bold lines, and first planetary gearset G1 and speed-shifting planetary gearset G21 except third sun gear S3 and second planet pinion Pb1, as shown by a hatch pattern.

The multiple-speed automatic transmission of the second embodiment is constructed and operated as discussed above. The following describes effects of the second embodiment. The multiple-speed automatic transmission of the second embodiment provides the same effects (E1), (E2), and (E3) as the first embodiment, and additionally the following effects. (E4) Employing a pinion gear with a single diameter or a single number of teeth as third planet pinion Pb21 results in simple and easy processing.

(E5) Placing fourth planet pinion Pb3 and third ring gear R3 outside second sun gear S2 results in multiplication of gear ratios without extending the overall longitudinal length.

The gearbox of the present invention, which is applied to the multiple-speed automatic transmission in the embodiments, may be applied to other types of transmissions.

The entire contents of Japanese Patent Application No. 2003-202222 (filed Jul. 28, 2003) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A multiple-speed transmission for an automotive vehicle, comprising:
    an input section;
    an output section;
    a speed-reducing planetary gearset comprising a first rotating element having a first primary speed slower than the input section, a second rotating element drivingly connected to the input section and having a second primary speed faster than the first primary speed in a same direction as the first rotating element, and a third rotating element held against rotation;
    a speed-shifting planetary gearset comprising five rotating members, wherein the five rotating members comprise a first rotating member, a second rotating member, a third rotating member, a fourth rotating member, and a fifth rotating member, wherein the second rotating member of the speed-shifting planetary gearset is drivingly connected to the output section;
    a first clutch for selectively drivingly connecting and disconnecting the first rotating element of the speed-reducing planetary gearset and the first rotating member of the speed-shifting planetary gearset;
    a second clutch for selectively drivingly connecting and disconnecting the first rotating element of the speed-reducing planetary gearset and the fourth rotating member of the speed-shifting planetary gearset;
    a third clutch for selectively drivingly connecting and disconnecting the second rotating element of the speed-reducing planetary gearset and the third rotating member of the speed-shifting planetary gearset;
    a first brake operable to hold selectively against rotation the third rotating member of the speed-shifting planetary gearset;
    a second brake operable to hold selectively against rotation the fourth rotating member of the speed-shifting planetary gearset; and
    a third brake operable to hold selectively against rotation the fifth rotating member of the speed-shifting planetary gearset.

2. The multiple-speed transmission as claimed in claim 1, wherein the speed-shifting planetary gearset takes a rotation state determined by a combination of rotations of two of the five rotating members of the speed-shifting planetary gearset, where each of the five rotating members of the speed-shifting planetary gearset has a rotation speed that monotonously varies in order of the first rotating member, the second rotating member, the third rotating member, the fifth rotating member, and the fourth rotating member.

3. The multiple-speed transmission as claimed in claim 1, further comprising a control unit that establishes a first speed ratio by engaging the first clutch and applying the first brake, a second speed ratio by engaging the first clutch and applying the third brake, a third speed ratio by engaging the first clutch and applying the second brake, a fourth speed ratio by engaging the first clutch and the second clutch, a fifth speed ratio by engaging the first clutch and the third clutch, a sixth speed ratio by engaging the second clutch and the third clutch, a seventh speed ratio by engaging the third clutch and applying the second brake, an eighth speed ratio by engaging the third clutch and applying the third brake, and a reverse speed ratio by engaging the second clutch and applying either of the first brake and the third brake.

4. A multiple-speed transmission for an automotive vehicle comprising:
    an input section;
    an output section;
    a speed-reducing planetary gearset comprising a first rotating element having a first primary speed slower than the input section, a second rotating element drivingly connected to the input section and having a second primary speed faster than the first primary speed in a the same direction as the first rotating element, and a third rotating element held against rotation;
    a speed-shifting planetary gearset comprising a first sun gear, a second sun gear, a third sun gear, a first ring gear drivingly connected to the output section, a first planet-pinion carrier, a first planet pinion rotatably supported on the first planet-pinion carrier and meshed with the second sun gear, a second planet pinion rotatably supported on the first planet-pinion carrier, the second planet pinion comprising a smaller-diameter section meshed with the third sun gear, and a larger-diameter section meshed with the first sun gear, the first ring gear, and the first planet pinion;
    a first clutch for selectively drivingly connecting and disconnecting the first rotating element of the speed-reducing planetary gearset and the second sun gear of the speed-shifting planetary gearset;
    a second clutch for selectively drivingly connecting and disconnecting the first rotating element of the speed-reducing planetary gearset and the first sun gear of the speed-shifting planetary gearset;
    a third clutch for selectively drivingly connecting and disconnecting the second rotating element of the speed-reducing planetary gearset and the first planet-pinion carrier of the speed-shifting planetary gearset;
    a first brake operable to hold selectively against rotation the first planet-pinion carrier of the speed-shifting planetary gearset;
    a second brake operable to hold selectively against rotation the first sun gear of the speed-shifting planetary gearset; and
    a third brake operable to hold selectively against rotation the third sun gear of the speed-shifting planetary gearset.

5. The multiple-speed transmission as claimed in claim 4, further comprising a control unit that establishes a first speed ratio by engaging the first clutch and applying the first brake, a second speed ratio by engaging the first clutch and applying the third brake, a third speed ratio by engaging the first clutch and applying the second brake, a fourth speed ratio by engaging the first clutch and the second clutch, a fifth speed ratio by engaging the first clutch and the third clutch, a sixth speed ratio by engaging the second clutch and the third clutch, a seventh speed ratio by engaging the third clutch and applying the second brake, an eighth speed ratio by engaging the third clutch and applying the third brake, and a reverse speed ratio by engaging the second clutch and applying either of the first brake and the third brake.

6. The multiple-speed transmission as claimed in claim 4, wherein the speed-reducing planetary gearset comprises:
- a fourth sun gear serving as the third rotating element;
- a second planet-pinion carrier serving as the first rotating element;
- a second ring gear drivingly connected to the input section and serving as the second rotating element; and
- a third planet pinion rotatably supported on the second planet-pinion carrier of the speed-reducing planetary gearset and meshed with the fourth sun gear and the second ring gear of the speed-reducing planetary gearset.

7. A multiple-speed transmission for an automotive vehicle comprising:
- an input section;
- an output section;
- a speed-reducing planetary gearset comprising a first rotating element having a first primary speed slower than the input section, a second rotating element drivingly connected to the input section and having a second primary speed faster than the first primary speed in a same direction as the first rotating element, and a third rotating element held against rotation;
- a speed-shifting planetary gearset comprising a first sun gear, a second sun gear, a first ring gear drivingly connected to the output section, a second ring gear, a first planet-pinion carrier, a first planet pinion rotatably supported on the first planet-pinion carrier and meshed with the second sun gear, a second planet pinion rotatably supported on the first planet-pinion carrier and meshed with the second ring gear, and a third planet pinion rotatably supported on the first planet-pinion carrier and meshed with the first sun gear, the first ring gear, the first planet pinion, and the second planet pinion;
- a first clutch for selectively drivingly connecting and disconnecting the first rotating element of the speed-reducing planetary gearset and the second sun gear of the speed-shifting planetary gearset;
- a second clutch for selectively drivingly connecting and disconnecting the first rotating element of the speed-reducing planetary gearset and the first sun gear of the speed-shifting planetary gearset;
- a third clutch for selectively drivingly connecting and disconnecting the second rotating element of the speed-reducing planetary gearset and the first planet-pinion carrier of the speed-shifting planetary gearset;
- a first brake operable to hold selectively against rotation the first planet-pinion carrier of the speed-shifting planetary gearset;
- a second brake operable to hold selectively against rotation the first sun gear of the speed-shifting planetary gearset; and
- a third brake operable to hold selectively against rotation the second ring gear of the speed-shifting planetary gearset.

8. The multiple-speed transmission as claimed in claim 7, further comprising a control unit that establishes a first speed ratio by engaging the first clutch and applying the first brake, a second speed ratio by engaging the first clutch and applying the third brake, a third speed ratio by engaging the first clutch and applying the second brake, a fourth speed ratio by engaging the first clutch and the second clutch, a fifth speed ratio by engaging the first clutch and the third clutch, a sixth speed ratio by engaging the second clutch and the third clutch, a seventh speed ratio by engaging the third clutch and applying the second brake, an eighth speed ratio by engaging the third clutch and applying the third brake, and a reverse speed ratio by engaging the second clutch and applying either of the first brake and the third brake.

9. The multiple-speed transmission as claimed in claim 7, wherein the speed-reducing planetary gearset comprises:
- a third sun gear serving as the third rotating element;
- a second planet-pinion carrier serving as the first rotating element;
- a third ring gear drivingly connected to the input section and serving as the second rotating element; and
- a fourth planet pinion rotatably supported on the second planet-pinion carrier of the speed-reducing planetary gearset and meshed with the third sun gear and the second ring gear of the speed-reducing planetary gearset.

10. A multiple-speed transmission for an automotive vehicle comprising:
- input means for receiving an input power;
- output means for outputting a transmitted power;
- speed-reducing means comprising a first rotating element having a first primary speed slower than the input means, a second rotating element drivingly connected to the input means and having a second primary speed faster than the first primary speed in a same direction as the first rotating element, and a third rotating element held against rotation;
- speed-shifting means comprising five rotating members, wherein the five rotating members comprise a first rotating member, a second rotating member, a third rotating member, a fourth rotating member, and a fifth rotating member, wherein the second rotating member of the speed-shifting planetary gearset is drivingly connected to the output means;
- first torque transmitting means for selectively drivingly connecting and disconnecting the first rotating element of the speed-reducing means and the first rotating member of the speed-shifting means;
- second torque transmitting means for selectively drivingly connecting and disconnecting the first rotating element of the speed-reducing means and the fourth rotating member of the speed-shifting means;
- third torque transmitting means for selectively drivingly connecting and disconnecting the second rotating element of the speed-reducing means and the third rotating member of the speed-shifting means;
- fourth torque transmitting means for holding selectively against rotation the third rotating member of the speed-shifting means;
- fifth torque transmitting means for holding selectively against rotation the fourth rotating member of the speed-shifting means; and
- sixth torque transmitting means for holding selectively against rotation the fifth rotating member of the speed-shifting means.

* * * * *